US008612052B2

(12) United States Patent
Nagasaka et al.

(10) Patent No.: US 8,612,052 B2
(45) Date of Patent: Dec. 17, 2013

(54) ROBOT DEVICE, MOVEMENT CONTROLLING APPARATUS AND METHOD FOR LEGGED LOCOMOTION ROBOT, SENSOR SYSTEM FOR LEGGED LOCOMOTION ROBOT, AND MOBILE UNIT

(75) Inventors: Kenichiro Nagasaka, Tokyo (JP); Jinichi Yamaguchi, Tokyo (JP); Satoru Shimizu, Kanagawa (JP); Yoshihiro Kuroki, Kanagawa (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 731 days.

(21) Appl. No.: 12/883,615

(22) Filed: Sep. 16, 2010

(65) Prior Publication Data

US 2011/0077775 A1 Mar. 31, 2011

Related U.S. Application Data

(62) Division of application No. 10/508,062, filed as application No. PCT/JP03/03228 on Mar. 18, 2003, now Pat. No. 7,881,824.

(30) Foreign Application Priority Data

Mar. 18, 2002 (JP) .................................. 2002-073498
Oct. 10, 2002 (JP) .................................. 2002-297207

(51) Int. Cl.
*G05B 15/00* (2006.01)
*G05B 19/00* (2006.01)

(52) U.S. Cl.
USPC .......... 700/260; 700/245; 700/247; 700/250; 700/251; 700/258; 700/261

(58) Field of Classification Search
USPC ................................................. 700/245–264
See application file for complete search history.

(56) References Cited

U.S. PATENT DOCUMENTS 5,349,277 A 9/1994 Takahashi et al.
5,355,064 A 10/1994 Yoshino et al.
(Continued)

FOREIGN PATENT DOCUMENTS

EP 0 572 285 12/1993
EP 0 765 797 4/1997
(Continued)

OTHER PUBLICATIONS

Huang et al., Humanoids Walk with Feedforward Dynamic Pattern and Feedback Sensory Reflection, 2001, IEEE, p. 4220-4225.

(Continued)

*Primary Examiner* — Bhavesh V Amin
(74) *Attorney, Agent, or Firm* — Frommer Lawrence & Haug LLP; William S. Frommer

(57) ABSTRACT

The lumbar part of a robot as a controlled-object point where the mass is moved to the largest extent is set as the origin of a local coordinate, an acceleration sensor is disposed at the controlled-object point to directly measure the attitude and acceleration at that position to control the robot to take a stable posture on the basis of a ZMP. Further, at each foot which touches the walking surface, there are provided a floor reaction force sensor and acceleration sensor to directly measure a ZMP and force, and a ZMP equation is formulated directly at the foot nearest to a ZMP position. Thus there can be implemented a stricter and quick control of the robot for a stable posture.

7 Claims, 22 Drawing Sheets

(56) References Cited

U.S. PATENT DOCUMENTS

| | | |
|---|---|---|
| 6,064,167 A | 5/2000 | Takenaka et al. |
| 6,243,623 B1 | 6/2001 | Takenaka et al. |
| 6,289,265 B1 | 9/2001 | Takenaka et al. |
| 6,697,709 B2 | 2/2004 | Kuroki et al. |
| 2001/0006334 A1 | 7/2001 | Suzuki |
| 2002/0016665 A1 | 2/2002 | Ulyanov et al. |

FOREIGN PATENT DOCUMENTS

| | | |
|---|---|---|
| EP | 1 103 451 | 5/2001 |
| EP | 1 120 203 | 8/2001 |
| EP | 1 344 611 | 9/2003 |
| EP | 1 344 612 | 9/2003 |
| JP | 5-245780 | 9/1993 |
| JP | 5-253866 | 10/1993 |
| JP | 7-104725 | 4/1995 |
| JP | 2507891 | 4/1996 |
| JP | 10-128688 | 5/1998 |
| JP | 11-48170 | 2/1999 |
| JP | 2001-212775 | 8/2001 |

OTHER PUBLICATIONS

Zhang et al., A new method of desired gait synthesis in biped robot, 2000, IEEE, p. 1300-1304.

Shih, Analysis of the dynamics of a biped robot with seven degrees of freedom, 1996, IEEE, p. 3008-3013.

Nishiwaki et al., Online Mixture and Correction of Basic Motions for Humanoid Walking Control by Footprint Specification, 2001, IEEE, p. 4110-4115.

ROBOT DEVICE, MOVEMENT CONTROLLING APPARATUS AND METHOD FOR LEGGED LOCOMOTION ROBOT, SENSOR SYSTEM FOR LEGGED LOCOMOTION ROBOT, AND MOBILE UNIT

This is a divisional of application Ser. No. 10/508,062, filed Jun. 13, 2005 now U.S. Pat. No. 7,881,824, which was filed under 35 USC 371 from International Application PCT/JP03/03228, filed Mar. 18, 2003, and is entitled to the priority filing dates of Japanese applications 2002-73498 and 2002-297207 filed Mar. 18, 2002 and Oct. 10, 2002, respectively, the entirety of which is incorporated herein by reference.

TECHNICAL FIELD

The present invention generally relates to a movement controlling apparatus and method for a legged locomotion robot having at least a plurality of moving legs, a sensor system for a legged locomotion robot, and a mobile device, and more particularly to a movement controlling apparatus and method for a legged locomotion robot, in which a ZMP (zero-moment point) is adopted as a stability criterion, a sensor system for a legged locomotion robot, and a mobile device.

More specifically, the present invention is directed to a movement controlling apparatus and method for a legged locomotion robot, in which a ZMP equation introduced based on measurements from sensors mounted at various portions of a robot is used to identify an unknown external force moment and unknown external force for controlling the movement of the robot, a sensor system for a legged locomotion robot, and a mobile device, sand more particularly to a movement controlling apparatus and method for a legged locomotion robot, in which a sensor system including sensors distributed on various portions of the robot is used to effectively measure movement parameters required for introduction of the ZMP equation, a sensor system for a legged locomotion robot, and a mobile device.

BACKGROUND ART

A mechanical apparatus designed based on the electrical and magnetic engineering to mimic human movements is called "robot". The term "robot" is said to have been derived from a Slavic word "ROBOTA (slave machine)". In Japan, the robots have become more widely prevalent at the end of 1960s. Many of such robots were industrial ones such as the manipulators and conveyance robots destined for automation and unmanning of the production operations in factories.

The recent researches and developments of the legged locomotive robots designed to have the physical mechanism and movements of bipedal upright-walking animals such as human beings, monkeys, etc., and it is more and more expected that such legged locomotive robots can be used in the practical applications. The bipedal movement in an upright posture is more unstable and difficult to control in attitude and walking than the movements on crawlers, four or six feet. However, the bipedal upright movement is more advantageous in the flexible movement over irregular ground surfaces, irregular access routes on which there exist obstacles, and stepped surfaces such as a stepway or ladder.

Also, the legged locomotive robots designed to implement the biological mechanism and movements of the human being is generally called "humanoid robot". The humanoid robot can support the human activity in the residential environment and other daily life, for example.

Almost all the human working spaces and dwelling spaces are defined for compliance with the body mechanism and behavior of the human being making bipedal upright-walking, and thus have many barriers against the current mechanical systems using wheels or any other driving devices as the moving means. Therefore, to work for the human beings and also for a further acceptability in the human dwelling spaces, the mechanical systems or robots should desirably be able to move in nearly the same range as the human moving range. It is considerably expected just in this respect that the practical applicability of the robots can be attained.

The significance of the research and development of the legged locomotion robots making bipedal upright-walking, called "humanoid robot" will further be described below from the following two points of view, for example.

One of the viewpoints stands on the human science. That is, a robot designed to have a structure similar to the lower limb and/or upper limb of the human body is controlled in various manners to simulate the walking of the human being. By the engineering through such processes, it is possible to elucidate the mechanism of the human being's natural movements including the walking. The results of such researches will also have a great contribution to the advances of various other fields of researches dealing with the movement mechanism, such as the human engineering, rehabilitation engineering, sports science, etc.

The other viewpoint is the development of practical robots capable of supporting the human life as a partner to the human being, namely, capable of helping the human being in activities in the residential environment and various other daily life situations. For the practical application of the robots of this type, they should be designed to grow up in functional respects by learning, while being taught by the users, the addressing to the human beings different in personality from each other or to different environments in various aspects of the human life environment. The "humanoid" robots are considered to effectively perform well for smooth communications with the human being.

Assume here that the robot is taught in practice to learn how to pass through a room while getting around an obstacle it should never step on. In this case, the user (worker) will be able to teach a bipedal upright-walking robot similar in figure to himself or herself with rather greater ease than a crawler type or quadrupedal robot whose figure is quite different from that of the user, and also the bipedal upright-walking robot itself will be able to learn more easily (refer to "Control of bipedal walking robots", Takanishi, "高塑 (Kouso)", Kantoh Branch of the Japan Automobile Technology Association, No. 25, April 1996).

There have already been proposed many techniques for attitude control and stable walking of the bipedal legged locomotion robots. The "stable walking" referred to herein may be defined as "movement on feet without falling".

The control of the robot to take a stable attitude is very important to prevent the robot from falling. The "falling" means an interruption of a job the robot has been doing. The robot will take considerable labor and time to recover its upright position from the tipping condition and resume the job. Also, the falling will possibly cause a critical damage to the robot itself and also to an object with which the robot has collided in falling. Therefore, the control of the robot to take a stable posture in walking or working is one of the most important technical problems in designing and development of a legged locomotion robot.

When the robot is walking, an acceleration developed with the gravity and walking movement will cause a gravity and inertial force from the moving system of the robot and their moments to act on the walking surface. According to the so-called d'Alembert's principle, the gravity, inertial force and their moments will be balanced with a floor reaction force as a reaction of the walking surface to the walking system and its moment. The consequence of this dynamical deduction is such that on or inside the sides of a supporting polygon defined by a point the foot sole touches and walking surface, there exists a point where the pitch and rolling-axis moment are zero, that is, a zero-moment point (ZMP).

Many proposals of the control of the legged locomotion robot to take a stable posture and prevention of the robot from falling while walking adopt the ZMP as a criterion for determination of walking stability. Creating a bipedal-walking pattern with reference to the ZMP is advantageous in permitting to preset points the foot sole will touch and easily consider toe-movement controlling conditions corresponding to the geometry of a walking surface. Also, since adopting a ZMP as the walking stability criterion leads to taking a trajectory, not any force, as the target value of movement control, so it is technically more feasible. It should be noted that the concept of the ZMP and adoption of the ZMP as a criterion for stability determination of a walking robot is disclosed in "Legged Locomotion Robots", Miomir Vukobratovic.

Generally, the bipedal walking robot such as "humanoid robot" has its center of gravity in a position higher than any quadrupedal walking robot, and it has a narrower ZMP region in which a ZMP is stable in walking. Therefore, the problem of posture change due to a change of the walking surface is important especially for the bipedal walking robot.

There have already been made some proposals to use a ZMP as a criterion for determination of the posture stability of bipedal walking robots.

For example, the Japanese Patent Application Laid-Open No. H05-305579 discloses a legged locomotion robot in which an on-surface point where a ZMP is zero is made to coincide with the target value of attitude control for stable walking.

Also, the Japanese Patent Application Laid-Open No. H05-305581 discloses a legged locomotion robot designed for a ZMP to exist inside a supporting polygon or in a position where there is at least a predetermined margin from the end of a supporting polygon when the foot sole touches and leaves a walking surface. Since the ZMP keeps the predetermined margin even when the robot is applied with a disturbance, so the robot can walk with an improved stability.

Also, the Japanese Published Patent Application Laid-Open No. H05-305583 disclosed a legged locomotion robot in which the moving speed is controlled according to the target position of a ZMP. More specifically, preset walking pattern data is used to drive the leg joints for the ZMP to coincide with the target position, an inclination of the robot's upper body is detected, and the spit-out rate of the preset walking pattern data is changed correspondingly to the detected inclination. When the robot stepping on unknown irregularities tilts forward, the normal posture can be recovered by increasing the data spit-out rate. Also, since the ZMP is controlled to its target value, the data spit-out rate can be changed without any trouble while the robot is supported on both feet.

Also, the Japanese Published Patent Application Laid-Open No. H05-305585 disclosed a legged locomotion robot in which the position the foot sole touches is controlled according to a ZMP target position. More specifically, the disclosed legged locomotion robot can walk stably by detecting a displacement between the ZMP target position and measured position and driving one or both of the legs so that the displacement is canceled, or detecting a moment about the ZMP target position and driving the legs so that the moment becomes zero.

Also, the Japanese Published Patent Application Laid-Open No. H05-305586 discloses a legged locomotion robot of which inclined attitude is controlled according to a ZMP target position. More particularly, the robot walks stably by detecting a moment, if any, developed about the ZMP target position, and driving the legs so that the moment becomes zero.

Basically, in controlling the robot to take a stable posture with the use of a ZMP as the stability criterion, there is searched a point existing on or inside the sides of a supporting polygon defined by a point the foot sole touches and walking surface and where the moment is zero.

More specifically, a ZMP equation descriptive of a balanced relation between moments applied to the robot body is derived and the target trajectory of the robot is corrected to cancel a moment error appearing in the ZMP equation.

For formulating a ZMP equation, it is necessary to determine a position and acceleration of a controlled-object point on the robot. In many of the conventional robot control systems using a ZMP as a stability criterion, a ZMP equation is derived by calculating acceleration data through two-step differentiation of the position data in the control system with data on the position of the controlled-object point being taken as sensor input.

In case only the above calculation based on the ZMP equation is used for controlling the robot to take a stable posture, the amount of calculation is larger, the load of data processing is larger and thus a longer time is required for the calculation. Further, since acceleration data is indirectly acquired, it cannot be accurate and thus it is difficult for the robot to implement an action for which the robot trajectory has to be corrected quickly and real-time, such as jump or running. Also, for a strict control of the robot posture, a plurality of controlled-object points should desirably be set on the robot. In this case, however, the data calculation will take an excessively long time, which will lead to an increased cost of manufacturing.

It is assumed here that the movement of the mobile machines including the legged robot is strictly controlled according to a ZMP equation, for example. In this case, the most strict control of the robot movement will be attained by controlling the position and acceleration of each point on the robot with measurement of an acceleration in a world coordinate of the origin of a local coordinate, position (posture) and acceleration of each point on the robot in the local coordinate, ZMP position, external force and external force moment, and introduction of the measured values in the ZMP equation to identify an unknown external force moment and external force.

The robot movement can be controlled with a minimum number of sensors including a clinometer (or accelerometer) and gyro provided on each axis (pitch, roll and yaw (X, Y and Z)) and six axial-force sensors disposed each at a point it is expected an external force and external force moment are applied to and which is apart from an actual position of action.

However, with the control system adopting the above arrangement of the sensors, it is difficult to control the robot movement by directly measuring positions and accelerations of all points on the robot in addition to the acceleration of the origin of the local coordinate.

The conventional robot movement control systems are based on the assumptions that:

(1) The external environment surrounding the robot will not change even if the robot is applied with any force and torque.

(2) The friction coefficient for a translation in the external environment surrounding the robot is large enough not to cause any slipping.

(3) The robot will not be deformed even if it is applied with any force and torque.

Therefore, on a gravel road whose surface will move when applied with a force and torque, a thick-piled carpet or on a tile floor in a house, slippery with no sufficient friction coefficient for translation, namely, in case the above assumptions are not assured, the conventional robot designed with a consideration given to the flexibility of the robot structure itself to implement a whole-body movement including a stable walking (movement) and jump will not perform well so long as its movement control system is based on the above assumptions.

DISCLOSURE OF THE INVENTION

Accordingly, the present invention has an object to overcome the above-mentioned drawbacks of the related art by providing an improved and novel movement controlling device and method for a legged locomotion robot, capable of making, based on a ZMP as a posture-stability criterion, a control for stabilization of the robot posture in moving.

Another object of the present invention is to provide an improved and novel movement controlling device and method for a legged locomotion robot, capable of strictly controlling the robot to take a stable posture by deriving a ZMP equation quickly and with a high accuracy.

Still another object of the present invention is to provide an improved and novel movement controlling device and method and an improved and novel sensor system for the legged locomotion robot, capable of well controlling, based on a ZMP as a posture-stability criterion, the robot to take a stable posture.

Yet another object of the present invention is to provide an improved and novel movement controlling device and method for a legged locomotion robot, and an improved and novel sensor system for the legged locomotion robot, capable of well controlling the robot movement by identifying an unknown external force moment and unknown external force using a ZMP equation introduced based on measured values from sensors provided at various points on the robot.

Still yet another object of the present invention is to provide an improved and novel movement controlling device and method for a legged locomotion robot, and an improved and novel sensor system for the legged locomotion robot, capable of efficiently measuring movement parameters required for introduction of a ZMP equation by a system of sensors distributed at various points on the robot.

The above object can be attained by providing a robot device including a basic unit and a plurality of moving units connected to the basic unit, the device including according to the present invention:

controlled-object points provided on the basic unit and at least one of the moving units, respectively;

a plurality of acceleration sensors disposed at the controlled-object points, respectively;

a means for controlling the moving units; and a means for calculating an unknown moment and/or unknown external force applied to the robot device with the use of a predetermined equation introduced based on acceleration information from each of the acceleration sensors, the controlling means controlling the moving units on the basis of the calculated unknown moment and/or unknown external force from the calculating means.

To assure a stability in posture of the robot device, the robot movement has to be controlled by introducing an equation for a stability criterion, such as ZMP equation or dynamic equation, for example, and canceling an unknown moment and unknown external force applied to the robot device. In case a ZMP exists inside a supporting polygon, no rotation or translation will occur in the system and it is not necessary to solve rotation and translation dynamic equations, and the ZMP equation is solved using an appropriate ZMP space defined by the system to control the robot to take a stable posture. Also, in case there exists no ZMP inside the supporting polygon or in case no support/action point in relation to the surrounding, the robot is controlled to be stable in posture by solving the dynamic equation. Further, in case the trajectories, such as dancing including a jump, of all points on the robot are uniformly given a high priority, both ZMP equation and dynamic equation are solved.

Note here that to formulate an equation, it is necessary to determine a position and acceleration of each of the controlled-object points on the robot. However, in a control system in which only position data on a controlled-object point is taken as a sensor input, the equation has to be derived after calculation acceleration data by differentiating or otherwise processing the position data toed to calculate acceleration data. In this case, the amount of calculation is larger, the load of data processing is larger and thus a longer time is required for the calculation. Further, since acceleration data is indirectly acquired, the acceleration data cannot be accurate and thus it is difficult for the robot to implement an action for which the robot trajectory has to be corrected quickly and real-time.

On the other hand, since acceleration sensors are provided at each of controlled-object points set at a plurality of locations or points on the robot, an equation can be introduced using accurate acceleration data and with a reduced amount of calculation. As a result, the trajectory can be well corrected even for an operation which should be done at a high speed, such as jumping and running.

Also the above object can be attained by providing a movement controlling device or method for a legged locomotion robot including at least a plurality of moving, the method including according to the present invention:

a state detecting means or step for detecting a dynamic state at each of a plurality of points on the robot; and a movement controlling means or step for controlling the movement of the robot on the basis of the result of detection from the state detecting step.

The above state detecting means or step includes an acceleration measuring means or step for measuring an acceleration at each controlled-object point on the robot, and a reaction force measuring means or step for measuring a ZMP and force at a contact of the robot with the surrounding. In such a case, the movement controlling means or step can correct a target trajectory of the robot by generating a ZMP equation descriptive of a balanced relation between moments applied to the robot and canceling a moment error appearing in the ZMP equation.

The fundamental of the robot posture stability control using a ZMP as a stability criterion is to search the inside of a supporting polygon defined by points the foot sole touches and a walking surface for a point where there is no moment. More specifically, in the robot posture control, a ZMP equation descriptive of a balanced relation between moments applied to the robot is derived, and a target trajectory of the robot is corrected to cancel a moment error appearing in the ZMP equation.

For example, the robot can be controlled most strictly will be attained by measuring an acceleration in a world coordinate of the origin of a local coordinate, position (posture) and acceleration of each controlled-object point on the robot in the local coordinate, ZMP position and external force moment and controlling the position and acceleration of each point.

However, the on-principle control of the robot posture, done by calculating the position and acceleration of each of all the points in addition to the measurement of the acceleration in the world coordinate of the origin of the local coordinate will be expensive and disadvantageous in housing a measurement system in the robot.

According to the present invention, a region of the robot as a controlled-object point where the mass is moved to the largest extent, for example, the lumbar part, is set as the origin of a local coordinate. A measuring means such as acceleration sensor is disposed at the controlled-object point to directly measure the posture and acceleration at that position of the robot. Thus, it is possible to make a ZMP-based posture control of the robot.

On the other hand, in case a point where the mass is moved largely is set as a controlled-object point, the state of the foot is not directly measured based on the world coordinate but it is relatively calculated based on the result of calculation of the controlled-object point. Therefore, the relation between the foot and walking surface should meet the following conditions:

(1) The walking surface will never move even if it is applied with any force and torque.

(2) The friction coefficient for a translation on the walking surface should be large enough not to cause any slipping.

The robot will not be able walk (move) stably on a gravel road whose surface will move is applied with a force and torque, a thick-piled carpet or on a tile floor in a house, slippery with no sufficient friction coefficient for translation, for example.

On this account, the present invention uses a reaction force sensor (floor reaction force sensor) provided at each foot which touches the walking surface to directly measure a ZMP and force, and a local coordinate used for the attitude control and an acceleration sensor to directly measure the local coordinate.

As a result, a ZMP equation can be formulated directly at the foot nearest to a ZMP position and thus there can be implemented a stricter and quick control of the robot for a stable posture, independent of the above-mentioned conditions.

Also, a greater mass movement can be incorporated in the control system, and a conjunction of the mass movement with results of direct measurements by an acceleration sensor and attitude sensor disposed at a region (lumbar part) used primarily for stabilization of the movement permits to implement a control of a legged locomotion robot for a stable posture, not dependent upon the aforementioned conditions.

Also, the state detecting means may include a local coordinate for attitude control and an acceleration sensor and angular velocity sensor to directly measure the coordinate, provided at each control point, and/or an acceleration sensor and attitude sensor, disposed in each vector position used in a calculation model.

In such a case, necessary control parameters for introduction of a ZMP equation (or dynamic equation) can be measured directly. As a result, a strict movement control can be implemented with a high response, not on the assumption that the robot is rigid enough not to be deformable with any external force applied.

The sensor system intended for the legged locomotion robot according to the present invention includes the acceleration sensor, angular acceleration sensor and angular velocity sensor, mounted at each point where the mass of the robot is concentrated.

Alternatively, the sensor system for the legged locomotion robot according to the present invention includes an acceleration sensor, angular acceleration sensor and angular velocity sensor, mounted near the center of gravity of each link.

Alternatively, the sensor system for the legged locomotion robot according to the present invention includes an acceleration sensor, angular acceleration sensor and angular velocity sensor, mounted near the center of gravity of each actuator forming the degree of freedom as the joint.

Alternatively, the sensor system for the legged locomotion robot according to the present invention includes acceleration sensors, angular acceleration sensors and angular velocity sensors, mounted near the center of gravity of each actuator and near the center of gravity of a link except for the actuator, respectively.

Alternatively, the sensor system for the legged locomotion robot according to the present invention includes an acceleration sensor, angular acceleration sensor and angular velocity sensor, mounted near the center of gravity of each actuator, center of gravity of a battery or neat the center of gravity of a link except for the battery and actuator.

Also, the sensors distributed over the robot may be connected in series to each other to sequentially add, at each of individual control points and along the connection route, moment terms and external force terms calculated based on sensor information at the individual control points. A sum of these terms can be efficiently calculated to calculate a ZMP equation and dynamic equation at a high speed.

The actuator forming the degree of freedom, as a joint, of the legged locomotion robot includes a motor composed of a rotor magnet and a stator formed from a magnetic coil having a plurality of phases, a gear unit to accelerate and decelerate the rotation of the motor, and a controller to control the supply of a power to the motor. On the controller, a sensor unit is mounted in a power near the two-dimensional center of gravity of an actuator unit.

The "sensor unit" includes a combination of one- to three-axis acceleration sensors, one- and two-axis angular velocity sensors and a three-axis angular velocity sensor, for example.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described in detail below concerning the embodiments thereof with reference to the accompanying drawings.

A. Mechanical Construction of the Legged Locomotion Robot

Figure 1:
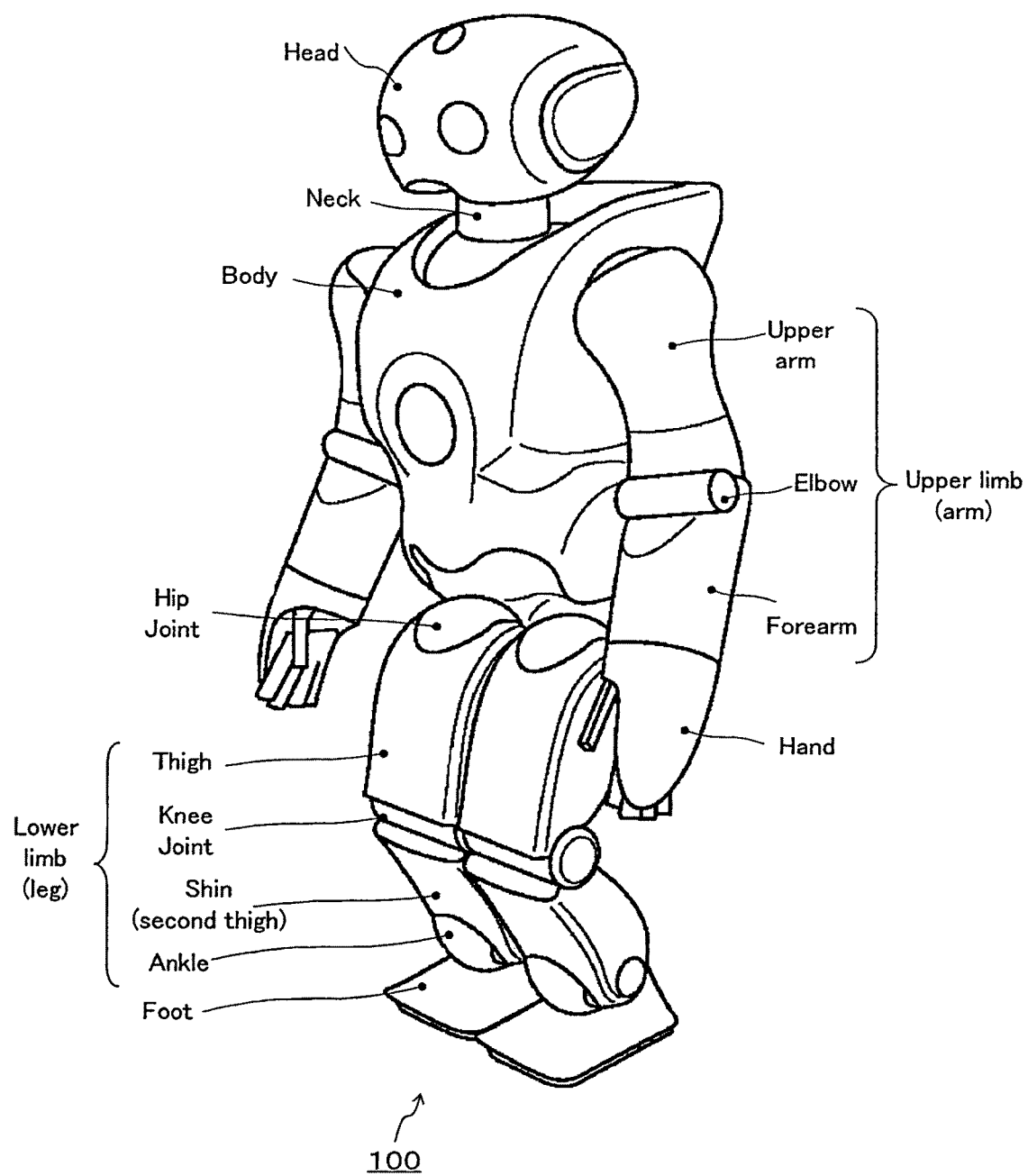
FIG. 1 is a front view of an embodiment of the legged locomotion robot according to the present invention, which is in upright position.
Figure 2:
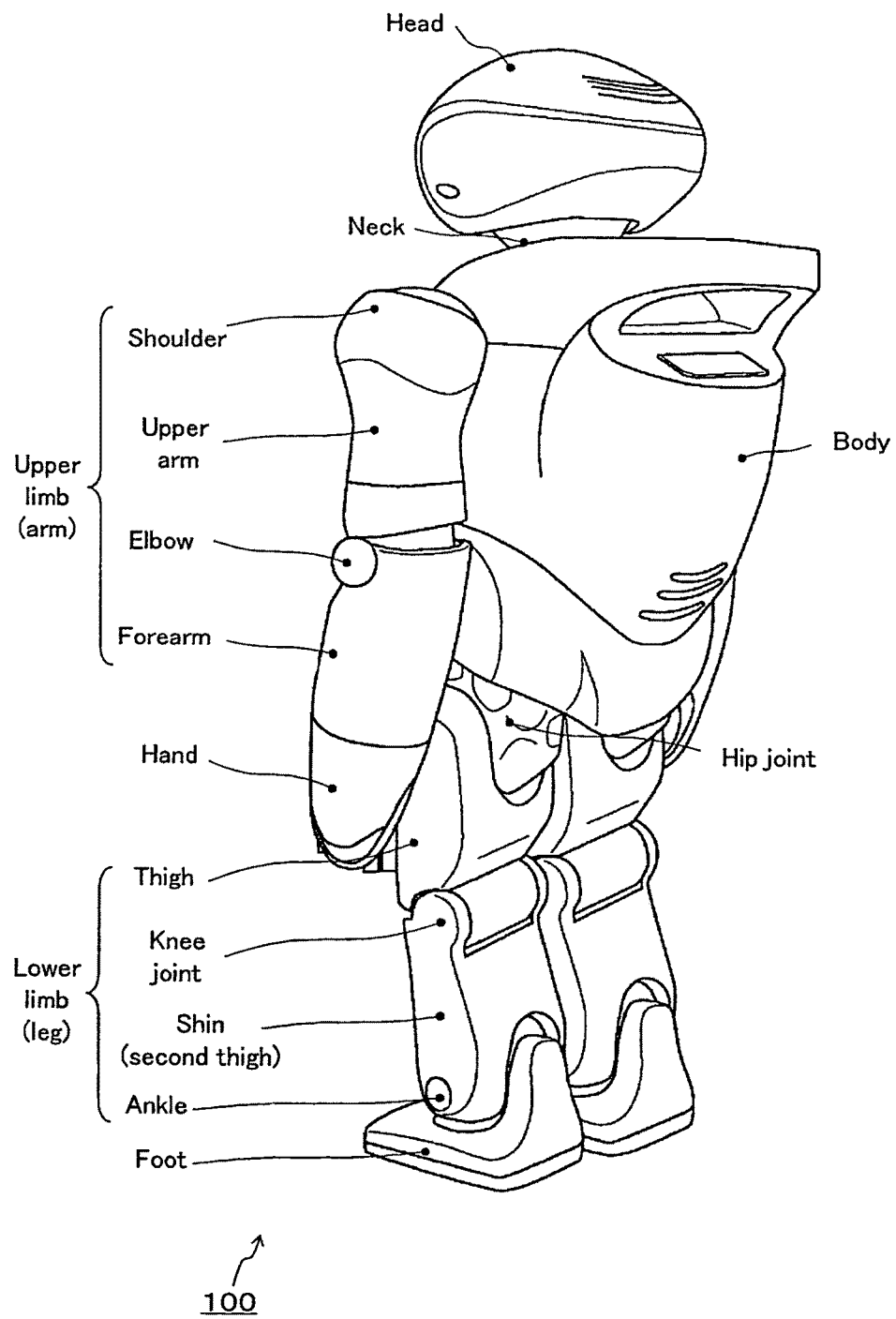
FIG. 2 is a rear view of the legged locomotion robot in the upright position in FIG. 1.

FIGS. 1 and 2 are front and rear views, respectively, of an embodiment of the humanoid type legged locomotion robot 100 according to the present invention. It is in upright position. As shown, the legged locomotion robot 100 includes a body, head, right and left upper limbs, and right and left lower limbs for the legged movement. A control unit (not shown) built in the body provides a system control of the entire robot.

Each of the right and left lower limbs includes a thigh, knee joint, second thigh, ankle and foot. The lower limb is coupled by a hip joint to the bottom of the trunk. Each of the right and left upper limb includes an upper arm, elbow joint and forearm. The upper limb is coupled by a shoulder joint to each upper edge of the trunk. Also, the head is coupled by a neck joint nearly to the upper end center of the trunk.

The control unit includes a housing in which there are mounted a main controller to control the driving of the joint actuators included in the legged locomotion robot 100 and process external inputs from sensors (will further be described), and peripheral devices such as a power circuit, etc. The control unit may further include a remote-controlling communication interface and communication device.

The legged locomotion robot 100 can make bipedal walking owing to the whole-body cooperative operation control by the control unit. Generally, the bipedal walking can be implemented by repeating a walking cycle divided into the following operation phases:

(1) Single support phase (left leg) with the right leg off the walking surface (2) Double support phase with the right foot being in touch with the walking surface (3) Single support phase (right leg) with the left leg off the walking surface (4) Double support phase with the left foot being in touch with the walking surface The walking of the legged locomotion robot 100 can be controlled by pre-planning a target trajectory for the lower limbs and correcting the planned trajectory in each of the above phases. That is, in the both-leg support phases, the height of the hip (lumber part) is corrected by a constant value using a total amount of correction with stopping the lower-limb trajectory correction. In the single-leg support phases, the trajectory is corrected for the relative geometric relation between the ankle of the leg whose trajectory has been corrected and the hip to fall within the planned trajectory.

The control of the robot for a stable position includes, in addition to the trajectory correction of the walking movement, an interpolation using the fifth polynomial to assure a continuous position, speed and acceleration for a smaller deviation from a ZMP (zero-moment point). The ZMP-based stability criterion is based on the "d'Alembert's, principle" that the gravity, inertial force and their moments will be balanced with a floor reaction force as a reaction of the walking surface to the walking system and its moment. The consequence of this mechanical deduction is such that on or inside the sides of a supporting polygon (ZMP stable region) defined by points the foot sole touches and walking surface, there exists a point where the pitch and rolling-axis moment are zero, that is, a zero-moment point (ZMP).

Figure 3:
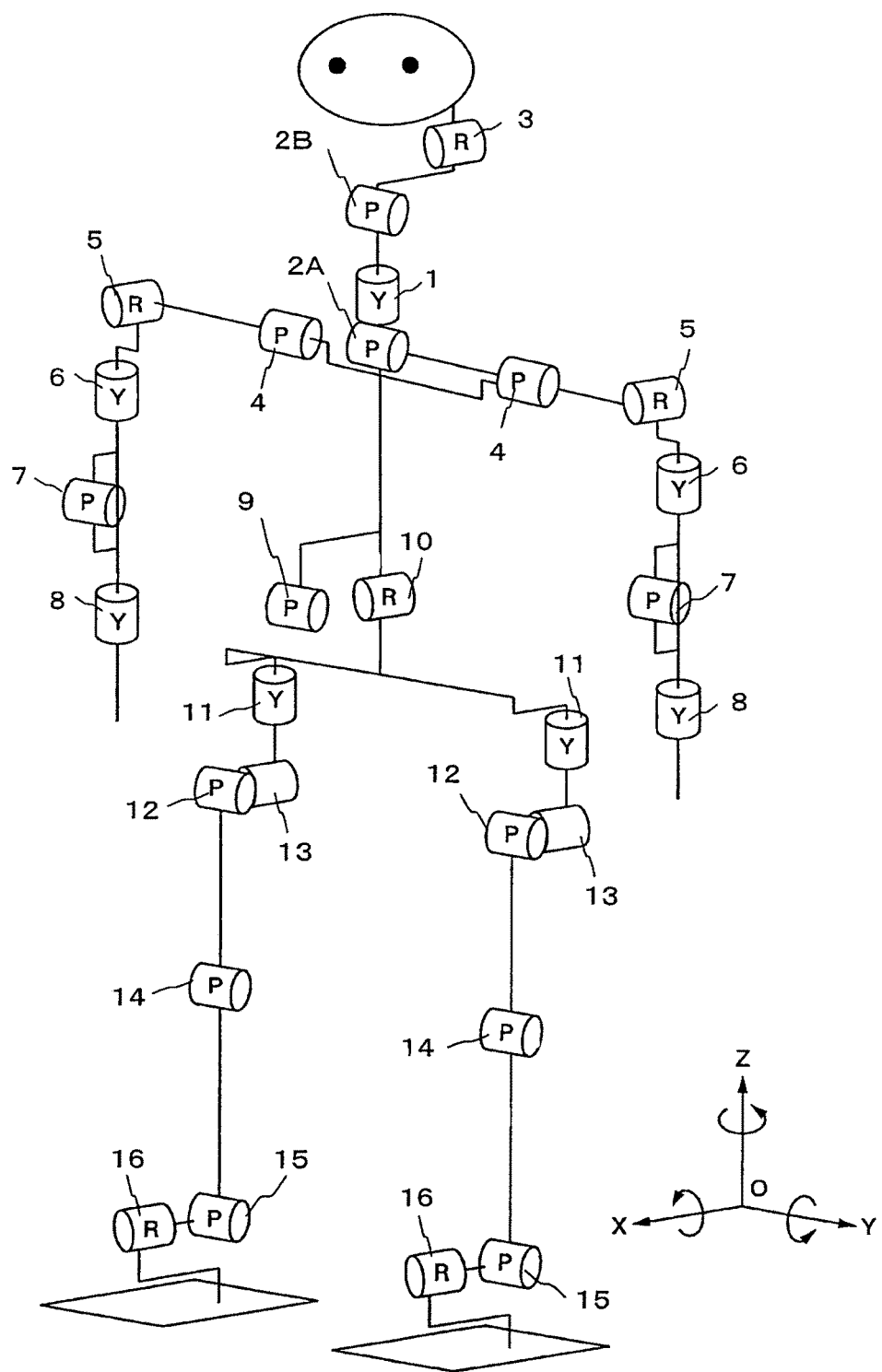
FIG. 3 schematically illustrates the degrees of freedom, as joints, of the legged locomotion robot according to the present invention.

FIG. 3 schematically illustrates the degrees of freedom, as the joints, of the legged locomotion robot 100. As shown in FIG. 3, the legged locomotion robot 100 is a structure including a trunk to which there is coupled a plurality of extremities or limbs such as an upper limb including two arms and a head and a lower limb including two legs which provide the movement of the robot 100.

The neck joint supporting the head has three degrees of freedom including a next joint yaw axis 1, first and second next joint pitch axes $2a$ and $2b$, and a neck joint roll axis 3.

Also, each of the arms has, as degrees of freedom, a shoulder joint pitch axis 4 at the shoulder, shoulder joint roll axis 5, upper arm yaw axis 6, elbow joint pitch axis 7 at the elbow, wrist joint yaw axis 8 at the wrist, and a hand. The hand is actually a structure including a plurality of fingers, namely, a plurality of joints and degrees of freedom.

The trunk has two degrees of freedom such as a trunk pitch axis 9 and trunk roll axis 10.

Also, each leg included in the lower limb includes a hip joint yaw axis 11, hip joint pitch axis 12 and hip joint roll axis 13 at the hip joint, a knee joint pitch axis 14 at the knee, an ankle joint pitch axis 15 and ankle joint roll axis 16 at the ankle, and a foot.

However, the legged locomotion robot 100 directed for entertainment should not have all the above-mentioned degrees of freedom or the degrees of freedom of such a robot are not limited to the above-mentioned ones. The degrees of freedom, that is, the number of joints, may of course be increased or decreased appropriately depending upon the restrictions and requirements imposed on the robot designing and manufacture.

Each of the aforementioned degrees of freedom of the legged locomotion robot 100 is actually an actuator. The actuator should preferably be small and lightweight because the robot should have a profile approximate to the natural shape of a human being with no excessive bulges and an unstable bipedal structure should be controlled to keep a stable posture. This embodiment of the present invention employs a small AC servo actuator having a servo control system formed in one chip and which is coupled directly to a gear and incorporated in a motor unit. An AC servo actuator of this type is disclosed in the Japanese Published Patent Application Laid-Open No. 2000-299970 already assigned to the Applicant of the present invention, for example. This embodiment adopts, as a directly coupled gear, a low deceleration gear which will attain a passive characteristic of the driving system itself which is required for the robot 100 in which a major consideration is given to the physical interaction with the human being.

B. Construction of Control System for the Legged Locomotion Robot

Figure 4:
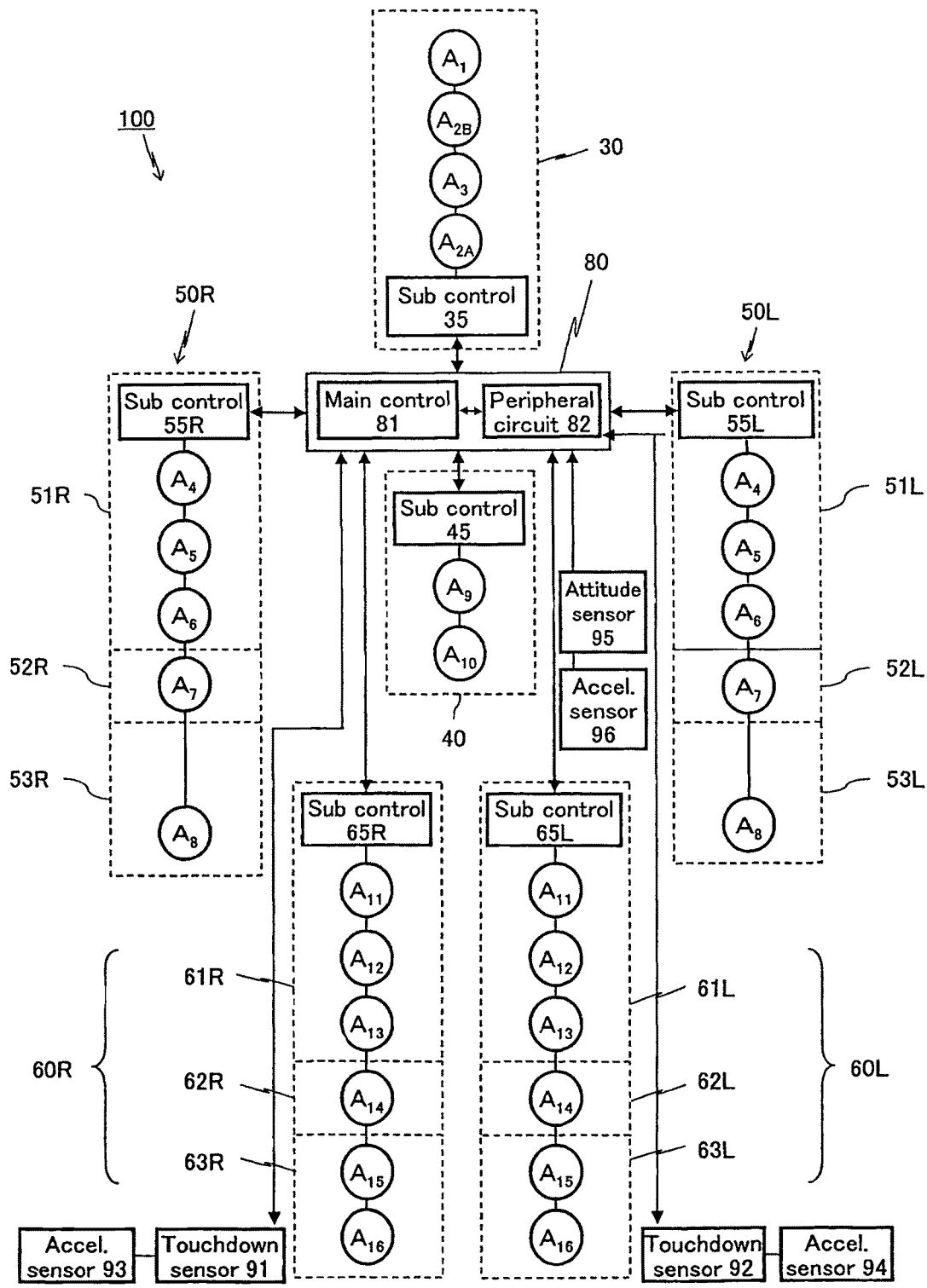
FIG. 4 schematically illustrates a control system used in the legged locomotion robot 100.

FIG. 4 schematically illustrates the construction of a control system adopted in the legged locomotion robot 100. As shown, the legged locomotion robot 100 includes working unit 30, 40, 50R/L and 60R/L, which mimic the four limbs (extremities) of a human being, and a main control unit 80 which provides an adaptive control for implementing a cooperation among the working units. Note that "R" and "L" are suffixed to a right- and left-hand things, respectively, for discrimination between the right and left sides.

The legged locomotion robot 100 is totally controlled by the main control unit 80. The main control unit 80 includes a main controller 81 including main circuit components (not shown) such as a CPU (central processing unit), memories, etc., and a peripheral circuit 82 including a power unit and interfaces (not shown) for transfer of data and commands to and from the components of the robot 100.

According to the present invention, the main control unit 80 may be located anywhere appropriate. Although the main control unit 80 is shown in FIG. 4 as being mounted in a truck unit 40, it may be mounted in a head unit 30. Alternatively, the main control unit 80 may be located outside the legged locomotion robot 100 and wire or radio communication be made with the robot 100.

Each of the joints, namely, degrees of freedom, of the legged locomotion robot 100 in FIG. 3 is attained by a corresponding actuator. More specifically, the head unit 30 has disposed therein a neck joint yaw axis actuator $A_1$, neck joint pitch axis actuator $A_2$ and neck joint roll axis actuator $A_3$ representing the neck joint yaw axis 1, neck joint pitch axis 2, neck joint roll axis 3, respectively.

Also, the truck unit 40 has disposed therein a trunk pitch axis actuator $A_9$ and trunk roll axis actuator $A_{10}$ representing the trunk pitch axis 9 and trunk roll axis 10, respectively.

Also, the arm unit 50R/L is subdivided into an upper arm unit 51R/L, elbow joint unit 52R/L and forearm unit 53R/L, and it has disposed therein a shoulder joint pitch axis actuator $A_4$, shoulder joint roll axis actuator $A_5$, upper arm yaw axis actuator $A_6$, elbow joint pitch axis actuator $A_7$ and wrist joint yaw axis actuator $A_8$ representing the shoulder joint pitch axis 4, shoulder joint roll axis 5, upper arm yaw axis 6, elbow joint pitch axis 7 and wrist joint yaw axis 8, respectively.

Also, the leg unit 60R/L is subdivided into a high unit 61R/L, knee unit 62R/L and shin (second thigh) unit 63R/L, and it has disposed therein a hip joint yaw axis actuator $A_{11}$, hip joint pitch axis actuator $A_{12}$, hip joint roll axis actuator $A_{13}$, knee joint pitch axis actuator $A_{14}$, ankle joint pitch axis actuator $A_{15}$ and ankle joint roll axis actuator $A_{16}$ representing the hip joint yaw axis 11, hip joint pitch axis 12, hip joint roll axis 13, knee joint pitch axis 14, ankle joint pitch axis 15 and ankle joint roll axis 16, respectively.

More preferably, the actuators $A_1$, $A_2$, $A_3$, . . . used at the joints can be formed each from a small AC servo actuator (as previously described) directly coupled to a gear and having the servo control system formed in one chip and which is built in a motor unit.

The working units including the head unit 30, trunk unit 40, arm unit 50 and leg unit 60 have sub controllers 35, 45, 55 and 65, respectively, for controlling the actuator driving.

The trunk 40 of the robot 100 has acceleration sensors 95 and attitude sensors 96 provided thereon. The acceleration sensors 95 are disposed in X-, Y- and Z-axial directions. With the acceleration sensors 95 disposed at the lumbar part of the robot 100, it is possible to set the hip or lumbar part where the mass is moved largely as a controlled-object point, directly measure a robot attitude and acceleration in that position, and control the robot 100 for a stable posture on the basis of a ZMP.

Also, the legs 60R and 60L have touchdown sensors 91 and 92 and acceleration sensors 93 and 94, respectively. Each of the touchdown sensors 91 and 92 is formed from a pressure sensor, for example, attached to the foot sole and can detect, depending on the existence of a floor reaction force, whether or not the foot sole has touched the walking surface or floor. Also, the acceleration sensors 93 and 94 are disposed in at least the X- and Y-axial directions. The acceleration sensors 93 and 94 provided at the left and right feet, respectively, permit to directly formulate a ZMP equation for the foot nearest to the ZMP position.

In case the acceleration sensor is provided only at the hip where the mass is moved largely, only the hip (lumbar part) is set as a controlled-object point while the state of the foot sole has to be calculated relatively on the basis of the result of calculation of the controlled-object point. The relation between the foot and walking surface should meet the following conditions:

(1) The walking surface will never move even if it is applied with any force and torque.

(2) The friction coefficient for a translation on the walking surface should be large enough not to cause any slipping.

On the other hand, in this embodiment, a reaction force sensor system (floor reaction force sensor or the like) to directly measure a ZMP and force is provided at the foot which is put into touch with the walking surface, and there is disposed a local coordinate used for the purpose of control and an acceleration sensor to directly measure the local coordinate. As a result, it is possible to directly formulate a ZMP equation for the foot nearest to the ZMP position and quickly implement a stricter control for a stable posture, not depending upon the aforementioned conditions. Therefore, it is possible to assure a stable walking (movement) of the robot even on a gravel road whose surface will move when applied with a force and torque, a thick-piled carpet or on a tile floor in a house, slippery with no sufficient friction coefficient for translation.

The main control unit 80 can dynamically correct a control target in response to an output from each of the sensors 91 to 93. More specifically, the main control unit 80 adaptively controls each of the sub controllers 35, 45, 55 and 65 to implement a whole-body movement pattern in which the upper limbs and trunk and lower limbs of the legged locomotion robot 100 will cooperate with each other.

In the whole-body movement of the robot 100, the main control unit 80 transfers, to the sub controllers 35, 45, 55 and 65, commands for setting a foot movement, ZMP (zero-moment point) trajectory, trunk movement, upper limb movement, hip height, etc. and for setting movements corresponding to the settings. Each of the sub controllers 35, 45, . . . will interpret a command received from the main controller 81 to output a drive control signal to each of the actuators $A_1$, $A_2$, $A_3$, . . . . The "ZMP" referred to herein is a point on a floor or walking surface where there exists no moment developed due to a floor reaction force developed when the robot 100 is walking. Also, the "ZMP trajectory" referred to herein means a trajectory along which a ZMP moves while the robot 100 is walking.

C. Controlling the Legged Locomotion Robot for a Stable Posture

Next, there will be described a procedure for stabilizing the posture of the legged locomotion robot 100 according to this embodiment in making a movement on legs, namely, in making a whole-body movement in which the feet, hip, trunk and lower limbs are in cooperation with each other.

For controlling the robot to take a stable posture according to this embodiment, a ZMP is used as a stability criterion. In the control of the robot for a stable posture using the ZMP as a stability criterion, there is basically searched a point on or inside the sides of a supporting polygon defined by points the foot sole touches and a walking surface, where no moment occurs. Namely, a ZMP equation describing a balanced relation between moments applied to the robot is derived, and a target trajectory of the robot is corrected to cancel a moment error appearing in the ZMP equation.

According to this embodiment, a point, as a controlled-object point on the robot, where the mass is moved to the largest extent, for example, the hip (lumbar part), is set as the origin of a local coordinate. A measuring means such as an acceleration sensor is disposed at the controlled-object point to measure an attitude and acceleration in that position, to thereby control the robot to take a stable posture on the basis of the ZMP. Further, an acceleration sensor is disposed at the foot which is put into touch with the walking surface to directly measure the local coordinate used for the purpose of control and the local coordinate, to thereby directly formulate a ZMP equation for the foot nearest to the ZMP position.

C-1 Introduction of a ZMP Equation

Figure 5:
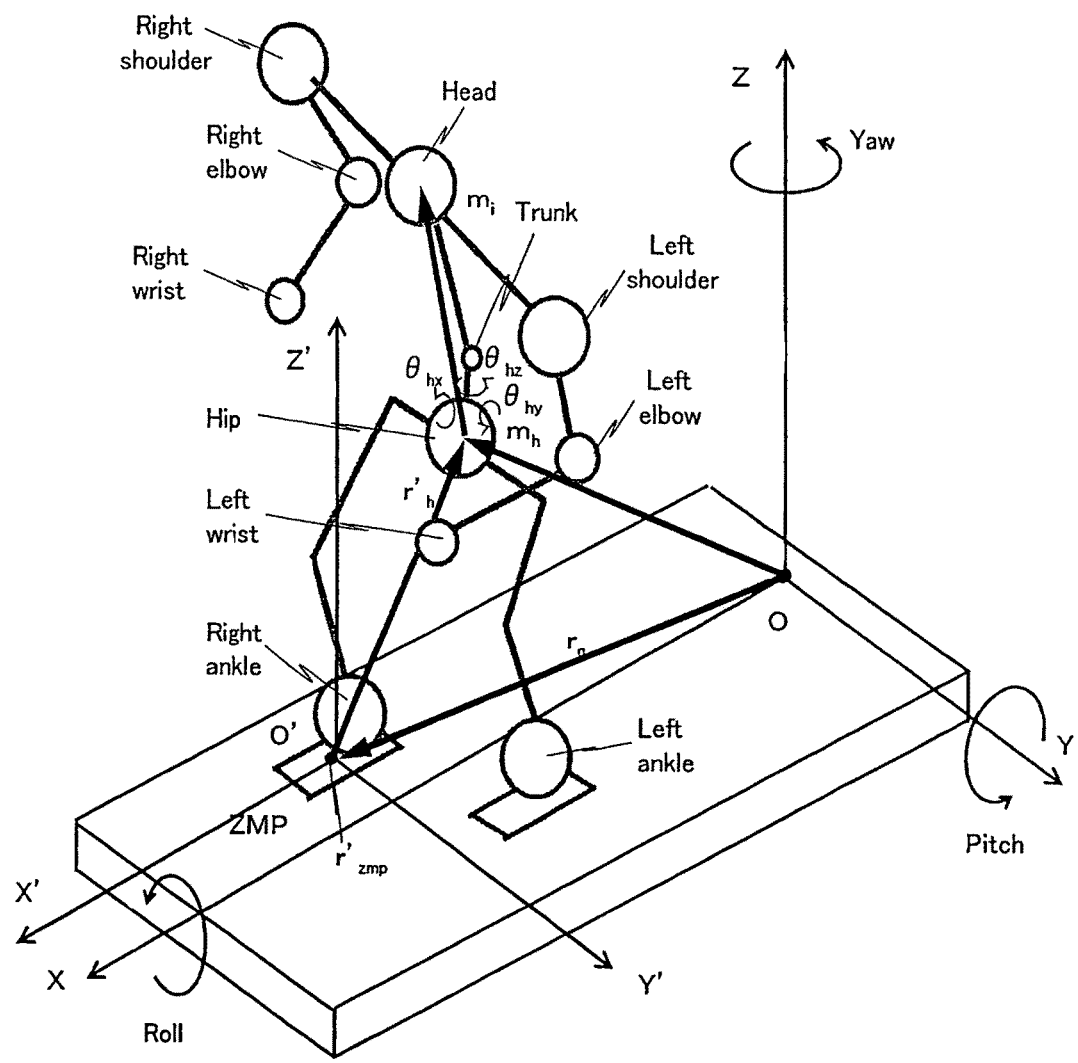
FIG. 5 shows an approximate model of multiple mass points of the legged locomotion robot 100.

The legged locomotion robot 100 according to this embodiment is an aggregate of infinite, that is, continuous mass points. However, note here that an approximate model formed from a finite number of discrete mass points is used in order to reduce the amount of calculation for the posture stabilization. More particularly, an approximate model formed from multiple mass points as shown in FIG. 5 is used in place of the legged locomotion robot 100 having multiple degrees of freedom as the joints as shown in FIG. 3. The illustrated approximate model is a linear, noninterference approximate model using multiple mass points.

In FIG. 5, an O-XYZ coordinate system indicates roll, pitch and yaw axes in an absolute coordinate system, and an O'-X'Y'Z' coordinate system indicates roll, pitch and yaw axes in a moving coordinate system which moves along with the robot 100. However, it should be noted that parameters in FIG. 5 mean as follows and that a symbol with an apostrophe relates to the dynamic coordinate.

$m_h$: Mass of hip mass point $\vec{r}'_h(r'_{hx}, r'_{hy}, r'_{hz})$: Position vector of hip mass point $m_i$: Mass of i-th mass point $\vec{r}'_i$: Position vector of i-th mass point $\vec{r}'_{zmp}$: Position vector of ZMP $\vec{g}(g_x, g_y, g_z)$: Gravity acceleration vector O'-X'Y'Z': Moving coordinate (moving along with the robot) system O-XYZ: Absolute coordinate system In the multi-mass point model shown in FIG. 5, "i" is a subscript indicative of an i-th mass point, "$m_i$" indicates a mass of the i-th mass point and "$r'_i$" indicates a position vector of the i-th mass point (in the moving coordinate system). The center of gravity of the legged locomotion robot 100 lies near the hip (lumbar part). That is, the hip is a mass point where the mass is moved to the largest extent. In FIG. 5, the mass of the hip is indicated with "$m_h$", the position vector of the hip (in the moving coordinate system) is indicated with $r'_h$ ($r'_{hx}$, $r'_{hy}$, $r'_{hz}$)". Also the position vector of the ZMP on the robot 100 is indicated with "$r'_{zmp}(r'_{zmpx}, r'_{zmpy}, r'_{zmpz})$".

The world coordinate system O-XYZ is an absolute coordinate system, and it is invariable. The legged locomotion robot 100 according to this embodiment has acceleration sensors 93, 94 and 96 disposed at the hip and feet of both the legs. A relative position vector $r_q$ among the hip, standing legs and the world coordinate system is detected from outputs from these sensors. On the other hand, the moving coordinate system, namely, the local coordinate system O-X'Y'Z' moves along with the robot.

So to speak, the multi-mass point model represents a robot in the form of a wire-frame model. As will be seen from FIG. 5, the multi-mass point approximate model includes both the shoulders, elbows and wrists, and the trunk, hip and both the ankles as mass points. In the non-strict multi-mass point model, a moment is expressed in the form of a linear equation and the moment expression will not interfere with the pitch and roll axes. The multi-mass point approximate model can be created generally as follows:

(1) A mass distribution of the entire robot 100 is determined.

(2) Mass points are set by either the designer's manual input or an automatic generation under a predetermined rule.

(3) The center of gravity is determined for each area "i", and the position of the center of gravity and mass $m_i$ are imparted to a corresponding mass point.

(4) Each of the mass points $m_i$ is represented as a sphere of which the radius is proportional to the mass with the mass-point position $r_i$ being taken as the center.

(5) The mass points actually coupled with each other, namely, spheres, are coupled to each other.

Figure 6:
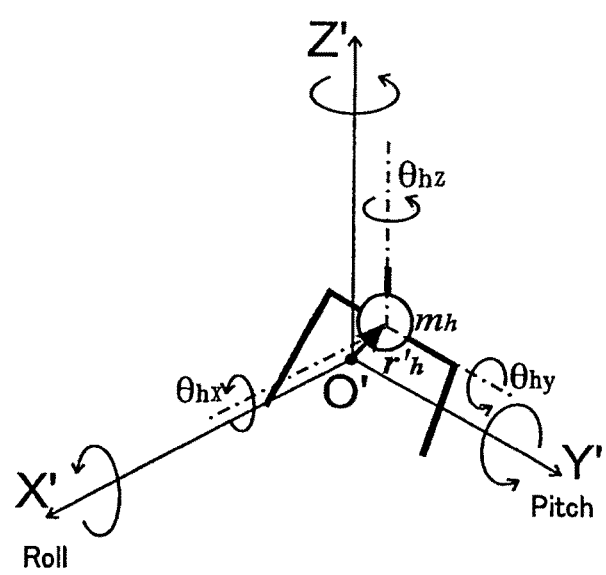
FIG. 6 is an illustration, enlarged in scale, of the lumbar part and its surrounding in the approximate model of multiple mass points.

Note that in the multi-mass point model in FIG. 6, each angle of rotation ($\theta_{hx}$, $\theta_{hy}$, $\theta_{hz}$) in the basic body, namely, the hip, defines the posture, namely, roll, pitch and yaw axes, of the legged locomotion robot 100.

The ZMP equation for the robot is descriptive of the balanced relation between the moments applied at the controlled-object point. As shown in FIG. 6, the robot is represented by multiple mass points and in case the mass points are taken as the controlled-object points, the ZMP equation is used to determine the sum of the moments applied at all the controlled-object points $m_i$.

The ZMP equations for the robot, described by the world coordinate system (O-XYZ), and the local coordinate system (O-X'Y'Z') are as follows, respectively:

ZMP equation represented by the world coordinate system:

$$\sum_{j}^{all-particles} m_i(r_i - r_{zmp}) \times \ddot{r}_i + T - \sum_{j} M_j - \sum_{k} (s_k - r_{zmp}) \times F_k = 0$$

$$r = r' + r_q$$

ZMP equation represented by the local coordinate system:

$$\sum_{j}^{all-particles} m_i(r'_i - r'_{zmp}) \times (\ddot{r}'_i + \ddot{r}_q) + T - \sum_{j} M_j - \sum_{k} (s'_k - r'_{zmp}) \times F_k = 0$$

$$\ddot{r} = \ddot{r}' + \ddot{r}_q$$

The above ZMP equations state that the sum of moments about the ZAP (radius $r_i - r_{zmp}$), developed due to an acceleration component applied at each mass point the sum of external force moment $M_i$ applied to each of the mass points $m_i$, and the sum of moments about the ZMP (the point of action of k-th external force $F_k$ is taken $s_k$), developed due to the external force $F_k$, are balanced with each other.

The equation of ZMP equilibrium includes a total moment compensation amount, namely, a moment error component T. The robot is kept in a stable posture by suppressing the moment error to zero or within a predetermined allowable range. In other words, correction of the robot movement (trajectories of the foot movement and upper-body components) for the moment error to be zero or less than an acceptable value is the key in the posture stability control using ZMP as a stability criterion.

Since the acceleration sensors 96, 93 and 94 are provided at the hip and right and left feet in this embodiment, the equation of ZMP equilibrium can be derived directly and accurately using the result of acceleration measurements at the controlled-object points. As a result, it is possible to assure a quick, stricter control of the robot for a stable posture.

C-2 Whole-Body Cooperative Control for a Stable Posture

Figure 7:
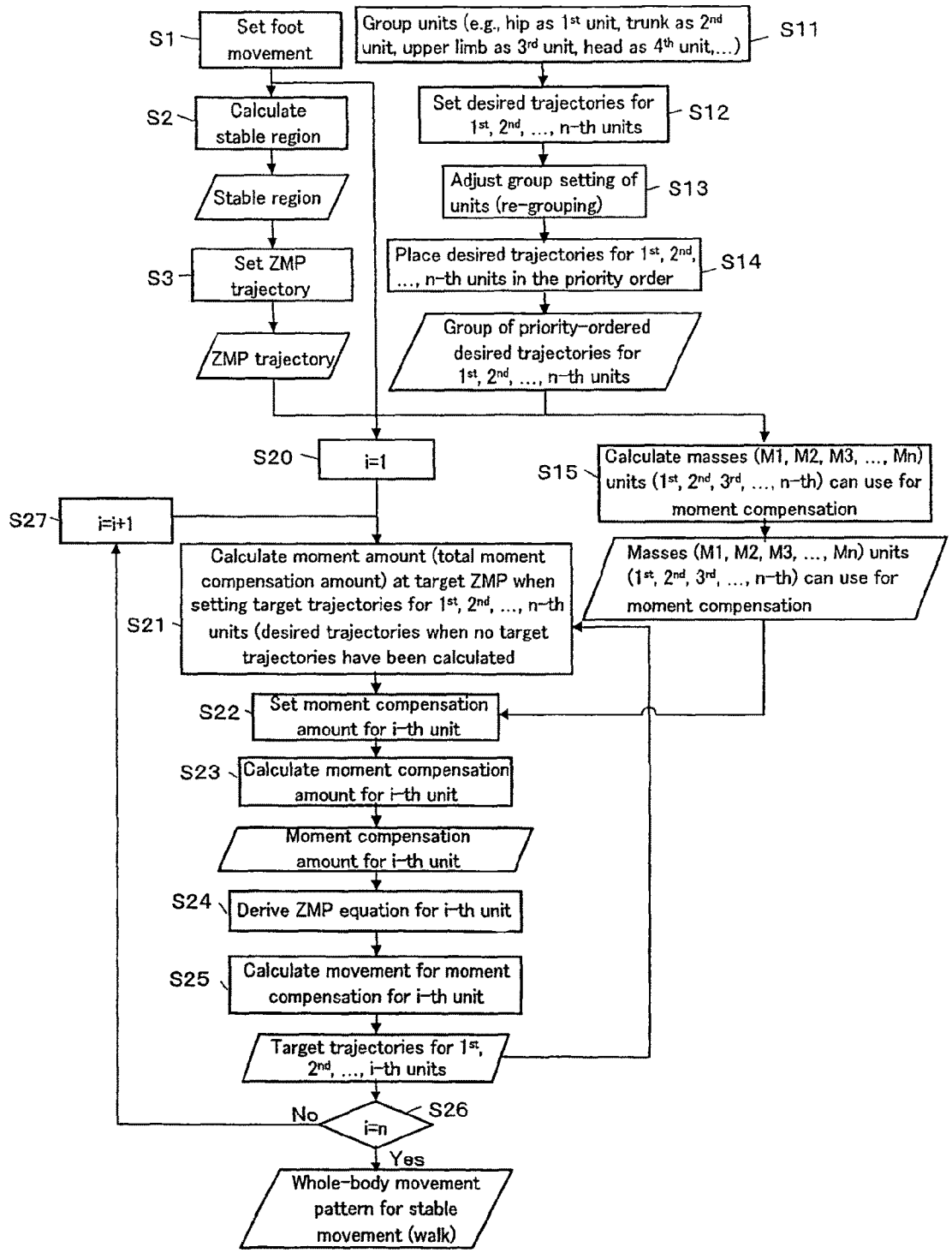
FIG. 7 shows a flow of operations made in creating a stable-walking movement of the legged locomotion robot 100.

FIG. 7 shows a flow of operations made in creating a movement of the legged locomotion robot 100 for a stable walking. In the following description, however, the joint position and movement of the legged locomotion robot 100 will be described using a linear, noninterference multi-mass point approximate model as shown in FIGS. 5 and 6.

First, a foot movement is set (in step S1). The foot movement is motion data on a time-series connection of two or more robot pauses.

The motion data include, for example, joint space information representing an angle change of each joint of the feet, and Cartesian space information representing a joint position. The motion data can be formed by screen-touch input on a console display screen or by a direct teaching to the robot, for example, a motion edition authoring system.

Next, a ZMP stable region is calculated based on the set foot movement (in step S2). ZMP is a point where a moment applied to the robot is zero, and it basically exists on or insides the sides of a supporting polygon defined by points the foot sole touches and walking surface. The ZMP stable region is a zone set in a position more deeply inside the sizes of the supporting polygon, and it can set the robot in a highly stable state by placing the ZMP in the region.

Then, a ZMP trajectory for the foot movement is set on the basis of the foot movement and ZMP stable region (in step S3).

Also, ZMP trajectories are set for a group of points of the upper half of the robot (above the hip joint), such as hip, trunk, upper limbs, head, etc. (in step S11).

A desired trajectory is set for each of the component group (in step S12). The trajectory setting for the upper half of the robot can be done by screen-touch input on a console display screen or by a direct teaching to the robot, for example, a motion edition authoring system, similarly to the trajectory setting for the feet.

Next, an adjustment (re-grouping) is made of the trajectory setting for each point (in step S13), and an order of priority is given to the re-grouped points (in step S14) for trajectory setting.

The "order of priority" referred to herein is an order in which the points of the robot are processed for the robot control for a stable posture. For example, the priority is allocated in a comparative order in amount of the mass movement in the points. As a result, priority-assigned groups of desired trajectories are made of the points on the upper half of the robot. The priority order may be changed between target trajectories correspondingly to a robot posture.

Also, a mass usable for the moment compensation is calculated for each group of points of the upper half of the robot (in step S15).

Then, a movement pattern for each group of the robot points is put into the posture stabilizing operation in the priority order set in step S14 on the base of the foot movement, ZMP trajectory and a group of desired trajectories for each group of points on the upper half of the robot.

In the posture stabilizing operation, first, an initial value 1 is put in the place of a processing variable "i" (in step S20). Then, there is calculated a moment amount on the target ZMP, that is, a total moment compensation amount, to be used for setting target trajectories for groups of points whose priority orders range from the top to i-th (in step S21). A desired trajectory is used for a point for which no target trajectory has been calculated.

Next, with the mass usable for the moment compensation of the point for which the moment amount has been calculated in step S15, a moment compensation amount is set for the point (in step S22) and calculated (in step S23).

Next, with the moment compensation amount calculated for the i-th point, a ZMP equation is derived for the i-th point (in step S24) and a moment compensation amount is calculated for that point (in step S25), to thereby permit to provide target trajectories for the points whose priority orders range from the top to i-th.

By making the above operations for all the point groups, a whole-body movement pattern for a stable movement (walking, for example) can be generated. That is, the whole-body movement pattern is generated by correcting all or a part of the target trajectories according to the solution of the ZMP equation (or dynamic equation which will be described in detail later) and a priority order assigned to each point.

In the procedure for generating the robot movement pattern as in FIG. 7, first, a foot movement is set to calculate a stable region for setting a ZMP trajectory, and then there are set priority orders of desired trajectories for the points on the upper half of the robot. However, the robot movement pattern may be generated in any other way. For example, priority orders of desired trajectories for the points on the upper half of the robot may first be set, and then the ZMP stable region calculation and ZMP trajectory setting may be done. In the former case, the priority orders of the desired trajectories are for the points on the upper half of the robot according to a ZMP trajectory having been set in advance. In the latter case, however, the stable region is calculated and ZMP trajectory is set to maintain the desired trajectory for each point on the upper half of the robot, having been set in advance.

Figure 8:
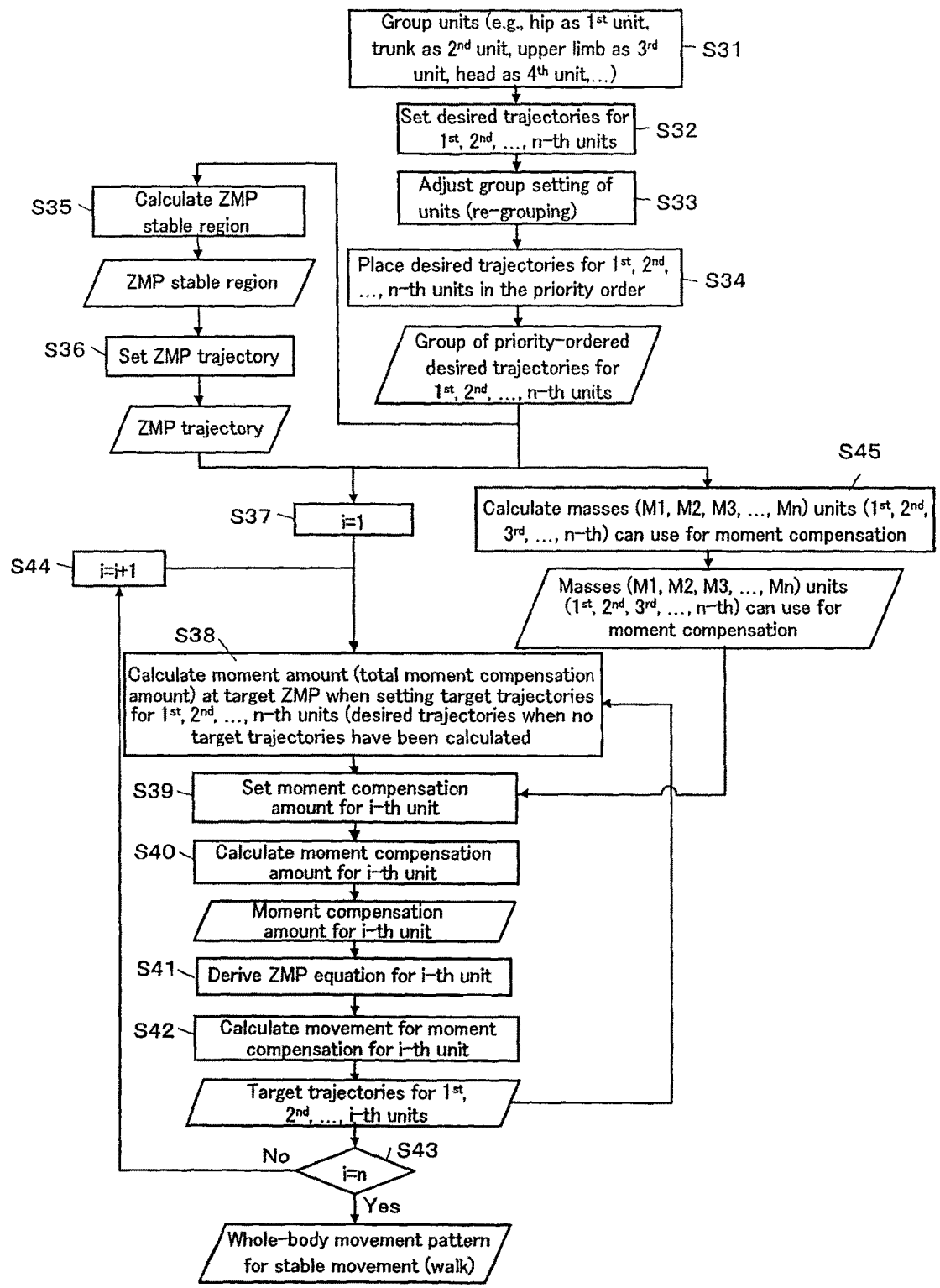
FIG. 8 also shows a variant of the flow of operations made in creating the stable-walking movement of the legged locomotion robot 100.

FIG. 8 shows a flow of operations made in generation of a robot movement by calculating a ZMP stable region and setting a ZMP trajectory after first setting a priority order for each of the points on the upper half of the robot.

First, ZMP trajectories are set for a group of points of the upper half of the robot (above the hip joint), such as hip, trunk, upper limbs, head, etc. (in step S31).

A desired trajectory is set for each of the component group (in step S32). The trajectory setting for the upper half of the robot can be done by screen-touch input on a console display screen or by a direct teaching to the robot, for example, a motion edition authoring system, similarly to the trajectory setting for the feet.

Next, an adjustment (re-grouping) is made of the trajectory setting for each point (in step S33), and an order of priority is given to the re-grouped points (in step S34) for trajectory setting.

The "order of priority" referred to herein is an order in which the points of the robot are processed for the robot control for a stable posture. For example, the priority is allocated in a comparative order in amount of the mass movement in the points. As a result, priority-assigned groups of desired trajectories are made of the points on the upper half of the robot. The priority order may be changed between target trajectories correspondingly to a robot posture.

Next, a ZMP stable region is calculated on the basis of the priority orders assigned to the desired trajectories set for the points on the upper half of the robot (in step S35). Then, a ZMP trajectory of a foot movement is set on the basis of the ZMP stable region (in step S36).

Also, a mass usable for the moment compensation is calculated for each group of points of the upper half of the robot (in step S45).

Then, a movement pattern for each group of the robot points is put into the posture stabilizing operation in the priority order set in step S34 on the base of the group of desired trajectories for each group of points on the upper half of the robot and ZMP trajectory.

In the posture stabilizing operation, first, an initial value 1 is put in the place of a processing variable "i" (in step S37). Then, there is calculated a moment amount on the target ZMP, that is, a total moment compensation amount, to be used for setting target trajectories for groups of points whose priority orders range from the top to i-th (in step S38). A desired trajectory is used for a point for which no target trajectory has been calculated.

Next, with the mass usable for the moment compensation of the point for which the moment amount has been calculated in step S45, a moment compensation amount is set for the point (in step S39) and calculated (in step S40).

Next, with the moment compensation amount calculated for the i-th point, a ZMP equation is derived for the i-th point (in step S41) and a moment compensation amount is calculated for that point (in step S42), to thereby permit to provide target trajectories for the points whose priority orders range from the top to i-th.

Now, there will be described how to set the order of priority for a desired trajectory as in step S14 in the flow diagram in FIG. 7.

On the assumption that the total moment compensation amount is $\Omega[Nm]$ and a mass usable for the moment compensation of the area "i" is $M_i[N]$ (i=1, 2, 3, ... n), the moment compensation amount for the area "i" will be $\alpha_i \times \Omega[Nm]$ where "i" is an absolute moment compensation amount coefficient and represented as follows using a relative moment compensation coefficient $\beta i$:

$$\alpha_i = \beta_i \times \frac{M_i}{\sum_{i=1}^{n} M_i} \text{ where } \sum_{i=1}^{n} \alpha_i = 1.0$$

The larger the deviation of the compensation amount coefficient from zero, the lower the order of priority of a desired trajectory is. The positive-going direction of the priority order contributes to a stabler movement while the negative-going direction results in a lower stability.

How to set the priority orders for desired trajectories for points on the upper half of the robot will be described concerning concrete examples.

Figure 9:
FIGS. 9 to 19 explain how to set the order of priority of desired trajectories of the upper half of the robot body.

For a movement pattern that a man moves a cart by hand as shown in FIG. 9, the priority of the hand trajectory is set higher. As an example of the priority setting, the priority of the hand movement is $\alpha=0.0$ while the total priority of the remainder is $\alpha=1.0$.

Figure 10:
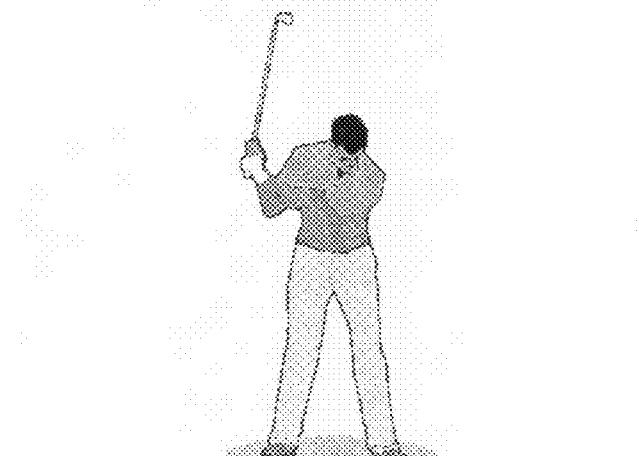

For a movement pattern that a man swings a golf club (or a baseball bat) holding it in both hands as shown in FIG. 10, the priority is set in the order of the hands and feet. As an example of the priority setting, the priority of the hands is $\alpha=0.0$, that of the feet is $\alpha=0.1$ and the total priority of the remainder is $\alpha=0.9$.

Figure 11:
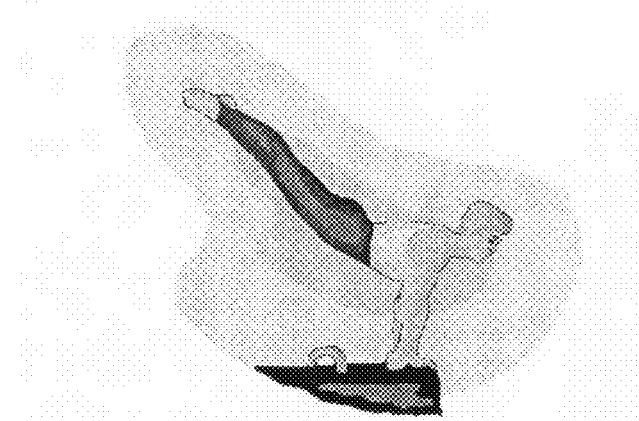

In a movement pattern of a pommel horse as an apparatus gymnastics as shown in FIG. 11, importance is attached to the support of the body with the hands alone and posture of the legs. Thus, higher priority is given to the hand trajectory, and to the trajectory of the trunk and lower limbs in combination. As an example of priority setting, the priority of the hands is $\alpha=0.0$. that of the trunk and lower limbs (trajectory of the shoulder) is $\alpha=0.0$, and the total priority of the remainder is $\alpha=1.0$.

Figure 12:

In a movement pattern that a waiter walks well-balanced in carrying a bottle, glasses and so forth on a tray as shown in FIG. 12, the priority is set for the hands, trunk, hip and feet in an descending order.

Figure 13:
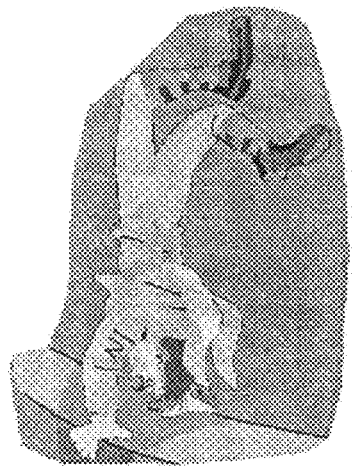

In a movement pattern such as a handstand as shown in FIG. 13, the whole body is supported on both hands to stabilize the posture. The priority is set for the hands, trunk and hip in a descending order. As an example of priority setting, the priority of the hands is $\alpha=0.0$, that of the trunk is $\alpha=0.2$, that of the hip is $\alpha=0.3$, and the total priority of the remainder is $\alpha=0.5$.

Figure 14:

In a movement pattern that a player should be in a balance supporting a stick applied at the lower end thereof to his forehead and having mounted on the upper end thereof a tray having a plurality of glasses placed thereon as shown in FIG. 14, a higher priority is set for the start of moving the player's head. As an example of priority setting, the priority of the trunk is $\alpha=0.0$ and the total, priority of the remainder is $\alpha=1.0$.

Figure 15:
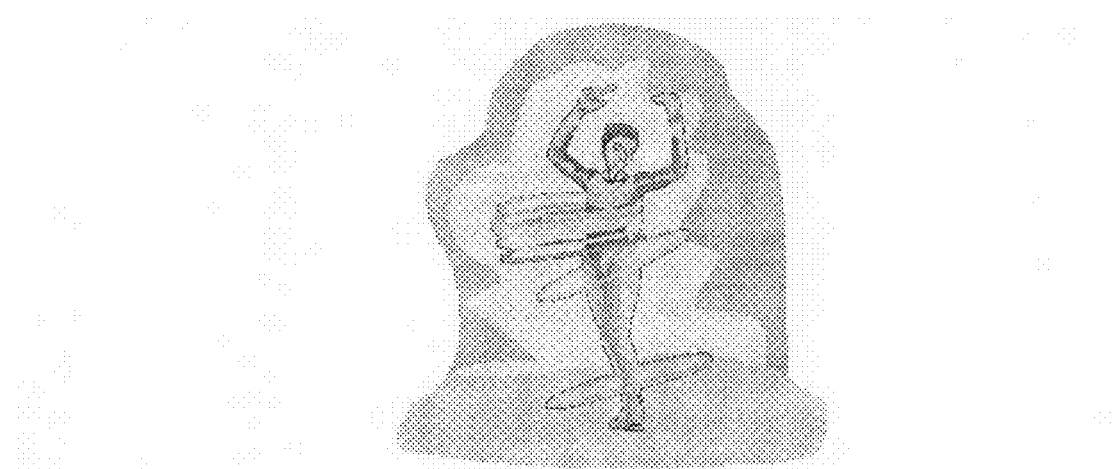

In a movement pattern that a plurality of Hula-Hoops is supported while being rotated about the hip and trunk as shown in FIG. 15, the priority is set higher for the trunk. As an example of priority setting, the priority of the trunk is $\alpha=0.0$ and the total priority of the remainder is $\alpha=1.0$.

Figure 16:
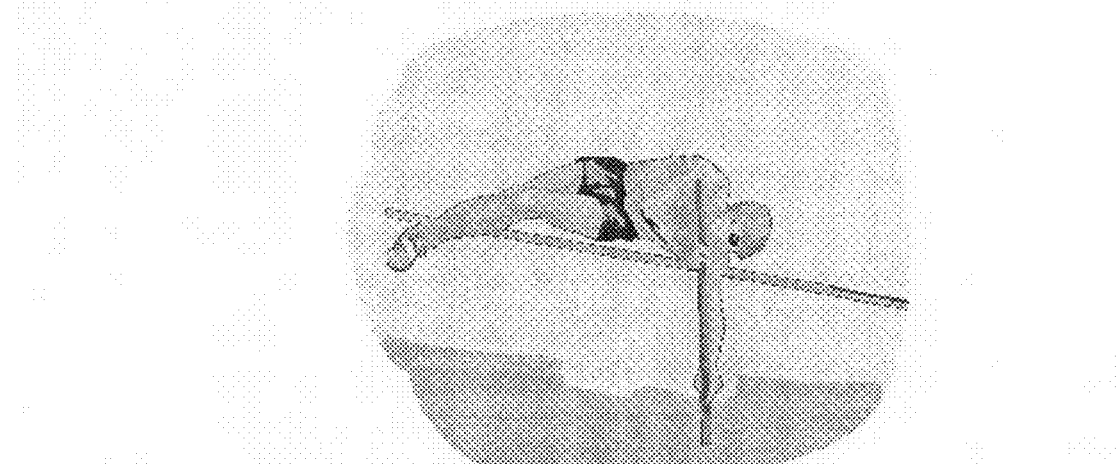

In a movement pattern such as a pole vault that an athlete runs with a long pole and jumps over a bar set at a height as shown in FIG. 16, the priority for the lower limbs, hip, trunk and upper limbs is variable as the time elapses. As an example of priority setting, the priority of the feet is $\alpha=0.0$ in the initial period, the priorities of the hip and trunk are $\alpha=0.0$ in the middle period, and the priority of the upper limbs $\alpha=0.0$ in the last period. The total priority of the remainder in each of the periods is $\alpha=1.0$.

Figure 17:
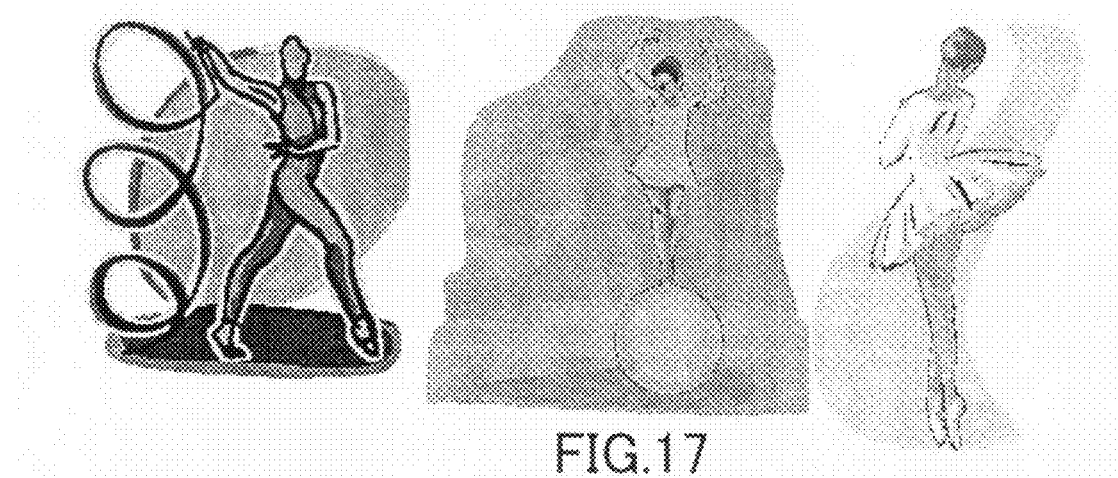

In a movement pattern such as a rhythmic gymnastics using ribbons, ball riding or ballet as shown in FIG. 17, the priorities of the trajectories of all points are set uniformly high. As an example of priority setting, a priority is set commonly for all the points, and the total priority is $\alpha=1.0$.

Figure 18:
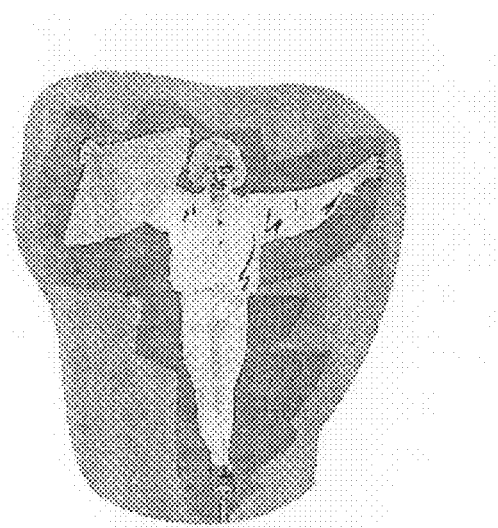

In a movement pattern such as a tightrope walking with both the hands being spread or using an umbrella as shown in FIG. 18, the priority is set for the feet, upper limbs and trunk in a descending order. As an example of priority setting, the priority of the feet is $\alpha=0.0$, that of the upper limbs and trunk is $\alpha=0.1$, and the total priority of the remainder is $\alpha=0.9$.

Figure 19:
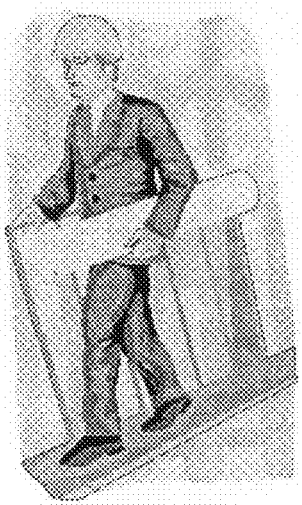

In a movement pattern such as walking on a scaffold installed along the outer wall of a building under construction as shown in FIG. 19, the priority is set for the upper limbs, trunk and feet in a descending order.

As an example of priority setting, the priority of the upper limbs and trunk is $\alpha=0.1$, that of the feet is $\alpha=0.2$ and the total priority of the remainder is $\alpha=0.7$.

D. Movement Control with Deformation of the Mechanical Hardware Taken in Consideration The conventional legged locomotion robot and designing of the robot on the basis of the dynamics are based on the assumption that the deformation of the robot when applied with an external force and torque is very small and can be neglected for movement of the entire robot. That is to say, since the conventional robot and its designing are based on the assumption that the distance between joints of the robot will not vary, one state sensor is sufficient for each element of the robot system.

However, when it is intended to provide a robot capable of making motions such as running and acceleration in a continuous and positive manner and thus having a high dynamic level, the robot will need a shock damping function utilizing even the deformation of the mechanical hardware itself and have a function to real-time solve a higher-order equation rapidly.

On this account, here will be proposed a sensor system construction not based on the assumption that the distance between joints of the robot is not variable and a distributed type high-speed movement control system using the sensor system.

Note that the following definitions (cf. "Dynamics of Mechanics", Japan Society of Mechanical Engineering, Ohm-sha, pp. 31 to 33, Mar. 25, 1991) are adopted herein:

Translation: Inertia force=−(Weight/Gravity acceleration)×Acceleration

Rotation: Moment of inertia=−(Extreme movement of inertia×Angular acceleration)

Extreme moment of inertia: Moment of inertia about axis of rotation

The legged locomotion robot according to this embodiment uses a ZMP (zero-moment point) as a stability criterion. The ZMP-based stability criterion is such that a system forms an appropriate ZMP space and when a ZMP exists inside a supporting polygon, no rotation and translation will occur in the system and thus no dynamic equation of any rotation and translation has not to be solved. It should be noted however that in case no ZMP exists inside the supporting polygon or in case no supporting point of action for the surrounding exists, a dynamic equation has to be solved in place of a ZMP equation.

The ZMP equation for the robot is a description of the balanced relation between the moments applied at the controlled-object point. The robot is represented by multiple mass points $m_i$, and in case the mass points are taken as the controlled-object points, the ZMP equation is used to determine the sum of the moments applied at all the controlled-object points $m_i$.

The ZMP equations of equilibrium, described by the world coordinate system (O-XYZ), and local coordinate system (O-X'Y'Z') of the robot are as follows, respectively:

ZMP equation represented by the world coordinate system:

$$\sum_{i}^{all-particles} m_i(r_i - P_{zmp}) \times \ddot{r}_i + T - \sum_j M_j - \sum_k (S_k - P_{zmp}) \times F_k = 0$$

$$r = r' + Q$$

ZMP equation represented by the local coordinate system:

$$\sum_{i}^{all-particles} m_i(\bar{r}_i - \bar{P}_{zmp}) \times (\ddot{\bar{r}}_i + \ddot{Q}) + T - \sum_j M_j - \sum_k (\bar{S}_k - \bar{P}_{zmp}) \times F_k = 0$$

$$\sum_{i}^{all-particles} m_i \bar{r}_i \times (\ddot{\bar{r}}_i + \ddot{Q}) - \sum_{i}^{all-particles} m_i \bar{P}_{zmp} \times (\ddot{\bar{r}}_i + \ddot{Q}) +$$

$$T - \sum_j M_j - \sum_k (\bar{S}_k - \bar{P}_{zmp}) \times F_k = 0$$

$$\ddot{r} = \ddot{\bar{r}} + \ddot{Q}$$

The above ZMP equations state that the sum of moments about the ZMP (radius $r_i - r_{zmp}$), developed due to an acceleration component applied at each mass point (or control point) $m_i$, the sum of external force moment $M_i$ applied to each of the mass points and the sum of moments about the ZMP (the point of action of k-th external force $F_k$ is taken $s_k$), developed due to the external force $F_k$, are balanced with each other.

The equation of ZMP equilibrium includes a total moment compensation amount, namely, a moment error component T. The robot is kept in a stable posture by suppressing the moment error to zero or within a predetermined allowable range. In other words, correction of the robot movement (trajectories of the foot movement and upper-body components) for the moment error to be zero or less than an acceptable value is the key in the posture stability control using ZMP as a stability criterion.

In the legged locomotion robot according to this embodiment, a reaction force sensor system to directly measure a ZMP and force is disposed at a point of direct contact with the surrounding, a local coordinate used for the movement control and an acceleration sensor and angular velocity sensor to directly measure the local coordinate are disposed, and an acceleration sensor and attitude sensor are provided at each vector position used in the calculation model, to thereby permit to directly measure control parameters required to introduce a ZMP equation (or a dynamic equation). Thus, a strict movement control can be implemented with an improved response, not on the assumption that the robot is rigid enough not to be deformable with any external force applied.

According to this embodiment, the reaction force sensor system is disposed as will be described below by way of example:

(1) An acceleration sensor, angular acceleration sensor and angular velocity sensor are mounted near a point where the mass is concentrated.

(2) An acceleration sensor, angular acceleration sensor and angular velocity sensor are mounted near the center of gravity of each link.

(3) An acceleration sensor, angular acceleration sensor and angular velocity sensor are mounted near the center of gravity of each actuator, (4) An acceleration sensor, angular acceleration sensor and angular velocity sensor are mounted near the center of gravity of each actuator and the center of gravity of each link except for the actuator.

(5) An acceleration sensor, angular acceleration sensor and angular velocity sensor are mounted near the center of gravity of each actuator, center of gravity of a battery and near the center of gravity of each link except for the battery and actuator.

In the above example (1), with the point where the mass is concentrated being taken as a control point, an acceleration component applied at each control point is directly measured at each control point, and thus there can be directly calculated at each point a moment term about a ZMP, thus generated, an external force moment term applied to the control point, a movement term about a ZMP, developed due to an external force applied to the control point. The moment terms collected from the control points are sequentially summed in the main control unit, to thereby permit to directly introduce a stricter ZMP equation of equilibrium. Also, since a moment term is directly measured at each control point, a strict movement control can be implemented with an improved response, not on the assumption that the robot is rigid enough not to be deformed by any external force applied.

Figure 20:
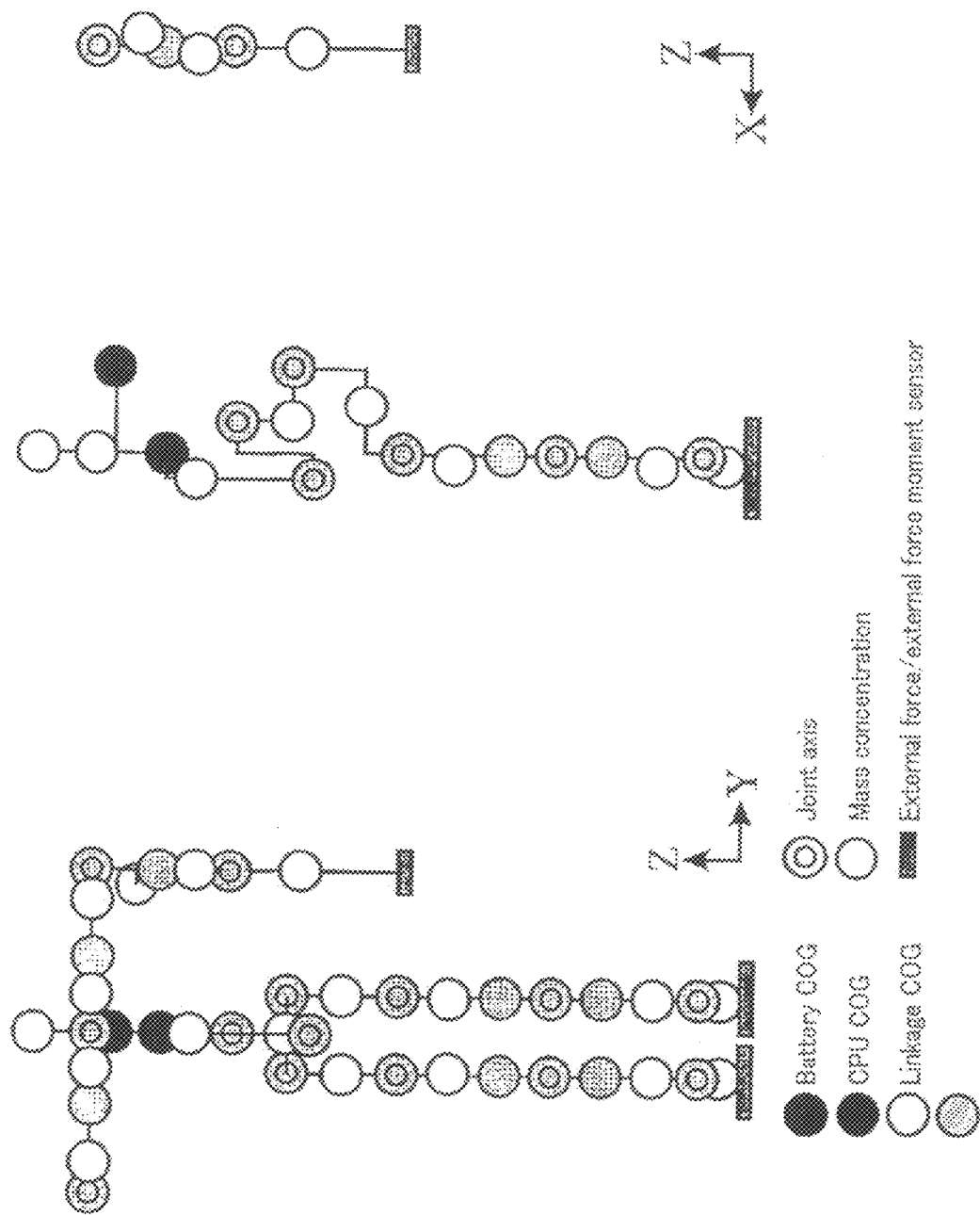
FIG. 20 shows an acceleration sensor, angular acceleration sensor and angular velocity sensor mounted at a point, where the mass is concentrated, on the legged locomotion robot.

The "point where the mass is concentrated" referred to herein means the center of gravity of the battery, that of the control unit, that of the link, that of the actuator, joint axis and other where the mass is concentrated. FIG. 20 shows an acceleration sensor, angular acceleration sensor and angular velocity sensor mounted at a point on the legged-locomotion robot where the mass is concentrated. As shown, an external force sensor and external force moment sensor are mounted on the hand palm and foot sole as major points of contacts with the surrounding.

Also, in the above example (2), with a point near each link coupling the joint being taken as a control point, an acceleration component applied at each control point is directly measured at each control point, and thus there can be directly calculated at each point a moment term about a ZMP, thus generated, an external force moment term applied to the control point, a movement term about a ZMP, developed due to an external force applied to the control point. The moment terms collected from the control points are sequentially summed in the main control unit, to thereby permit to directly introduce a stricter ZMP equation of equilibrium. Also, since a moment term is directly measured at each control point, a strict movement control can be implemented with an improved response, not on the assumption that the robot is rigid enough not to be deformed by any external force applied.

Figure 21:
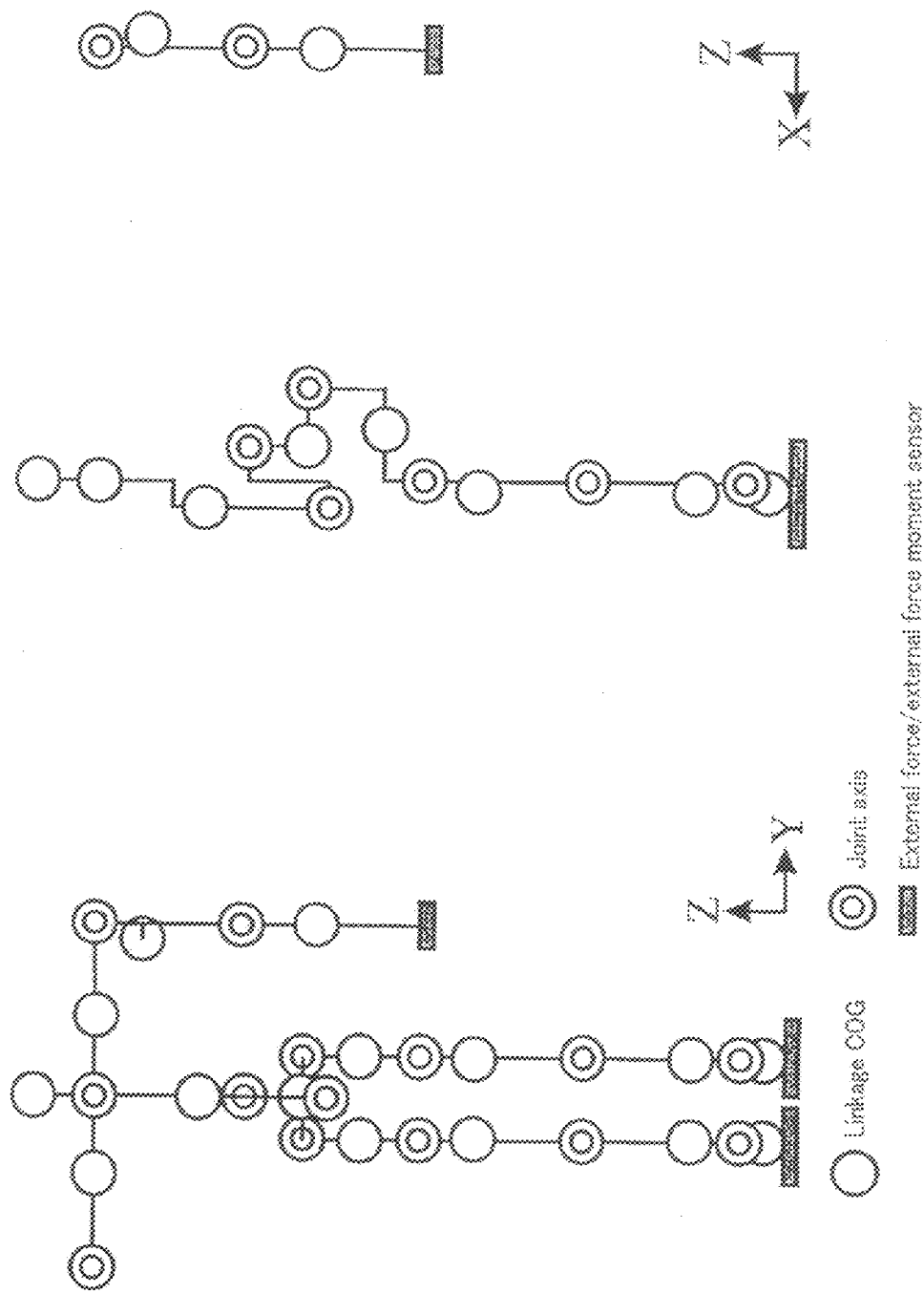
FIG. 21 shows an acceleration sensor, angular acceleration sensor and angular velocity sensor mounted near the center of gravity of each of links of the legged locomotion robot.

FIG. 21 shows an acceleration sensor, angular acceleration sensor and angular velocity sensor mounted at a point near the center of gravity of each link on the legged locomotion robot. As shown, an external force sensor and external force moment sensor are mounted on the hand palm and foot sole as major points of contacts with the surrounding.

Also, in the above example (3), with a point near each actuator as a major point on the robot where the mass is concentrated being taken as a control point, an acceleration component applied at each control point is directly measured at each control point, and thus there can be directly calculated at each point a moment term about a ZMP, thus generated, an external force moment term applied to the control point, a movement term about a ZMP, developed due to an external force applied to the control point. The moment terms collected from the control points are sequentially summed in the main control unit, to thereby permit to directly introduce a stricter ZMP equation of equilibrium. Also, since a moment term is directly measured at each control point, a strict movement control can be implemented with an improved response, not on the assumption that the robot is rigid enough not to be deformed by any external force applied.

Figure 22:
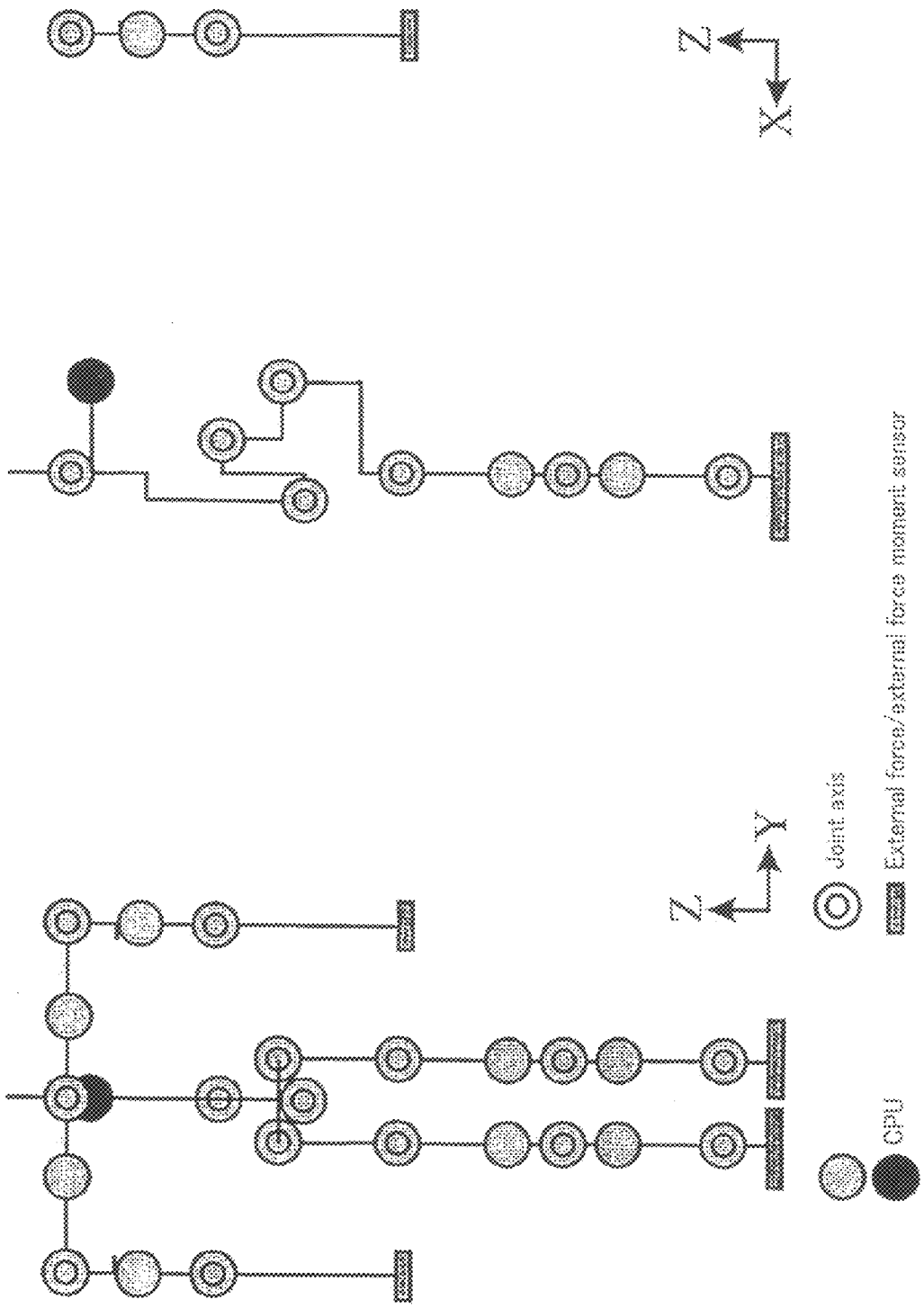
FIG. 22 shows an acceleration sensor, angular acceleration sensor and angular velocity sensor mounted near the center of gravity of each of actuators of the legged locomotion robot.

FIG. 22 shows an acceleration sensor, angular acceleration sensor and angular velocity sensor mounted at a point near the center of gravity of each actuator on the legged locomotion robot. As shown, an external force sensor and external force moment sensor are mounted on the hand palm and foot sole as major points of contacts with the surrounding.

Note that the distributed type reaction force sensor system as illustratively described in (1) to (5) above can measure an actual center of rotation on the basis of the information from the acceleration sensor located at each control point. Therefore, different from the conventional case in which the center of gravity can uniquely be determined from the design information on the robot, it is possible to dynamically calculate a more accurate position of the center of gravity even if the link of the robot is deformed by any external force.

Figure 23:
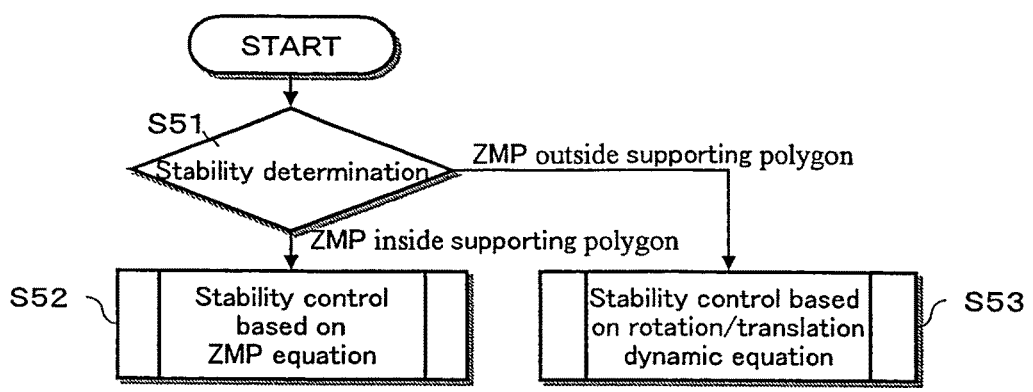
FIG. 23 shows a flow of operations made in the movement control of the legged locomotion robot.

FIG. 23 shows a flow of operations made in the movement control of the legged locomotion robot according to this embodiment.

First, the legged locomotion robot is determined to check the posture stability (in step S51). It can be judged referring to the supporting polygon on the robot whether the ZMP position is within the stable region.

In case the ZMP is inside the supporting polygon, no rotation and translation will take place in the system and it is not necessary to solve a dynamic equation as to any rotation and translation. Then, the operation goes to step S52 where a ZMP equation will be solved using an appropriate ZMP space formed by the system, thereby controlling the robot to take a stable posture (will be described in detail later).

On the other hand, in case no ZMP is inside the supporting polygon or in case there is no supporting point of action for the surrounding, a dynamic equation is solved in place of a ZMP equation (in step S53) to control the posture stability.

Note that in case a high priority is uniformly given to the trajectories of all the points, for example, in a dance including a jumping, both a ZMP equation and dynamic equation are solved in some cases.

Figure 24:
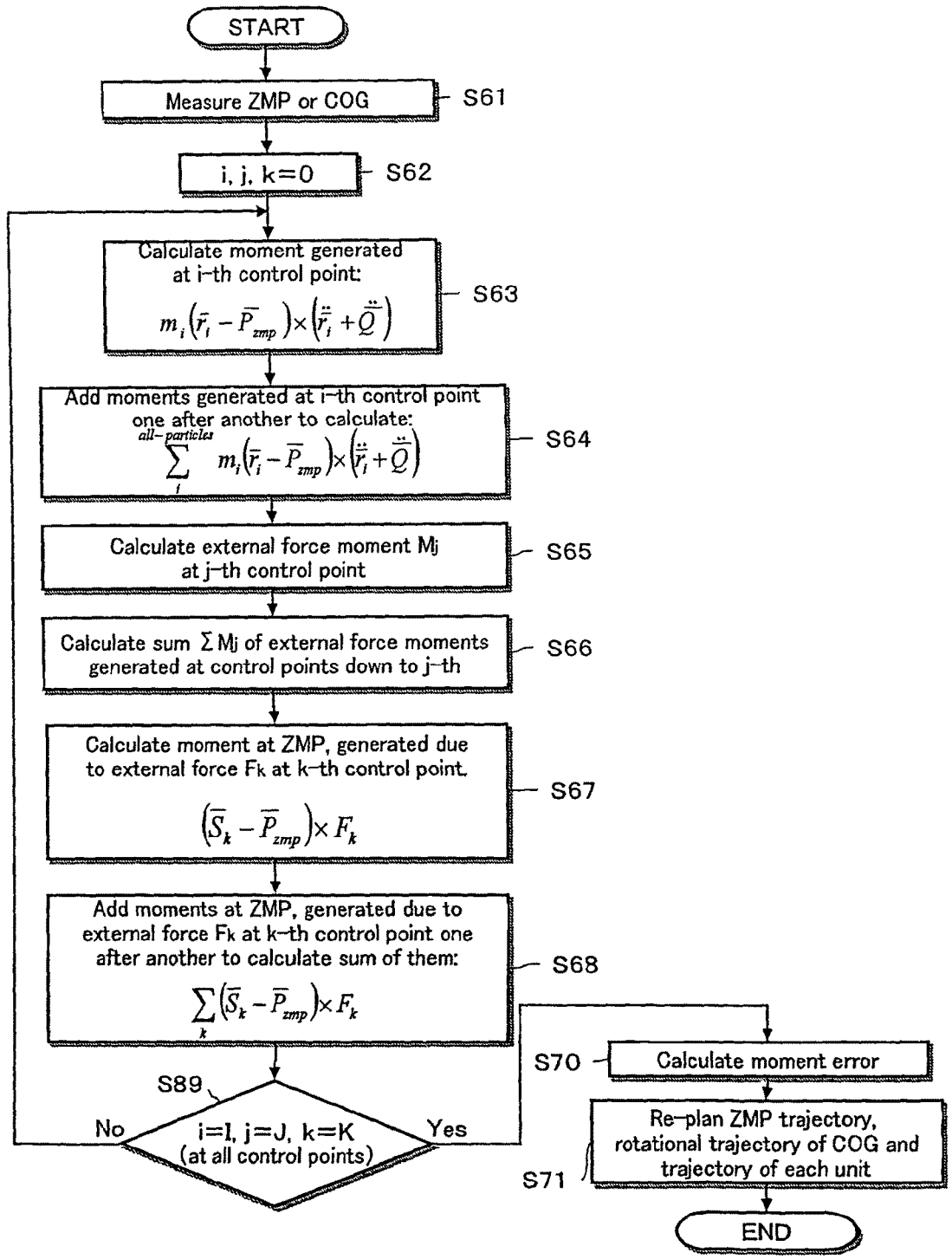
FIG. 24 shows a flow of operations made in controlling the robot to take a stable position on the basis of a solution of a ZMP equation.

FIG. 24 shows a flow of operations made in controlling the robot stability on the basis of a solution of a ZMP equation as in step S52.

First, a ZMP is measured or the center of gravity is measured on the basis of information from the acceleration sensor, angular acceleration sensor and angular velocity sensor provided at each control point such as a point where the mass is concentrated, a point near the center of gravity of each link and a point near the center of gravity of each actuator (in step S61). When the robot is deformed under the action of an external force applied, it is necessary to dynamically measure the center of gravity on the basis of a measurement made by the acceleration sensor.

Next in a processing loop formed by steps S62 to S69, a moment term about a ZMP at each control point, an external force moment term applied to the control point and a moment about a ZMP, developed due to an external force applied to the control point are calculated directly based on information from a sensor provided at each control point. The calculation is first made of moments at a point near. ZMP or center of gravity. These moment terms are added one after another to determine a sum of them.

As a result, a moment error T can be calculated using a ZMP equation in step S70).

Next, with an external force moment identified as the state of each measured point being taken as an initial value, the ZMP trajectory or rotating trajectory of the center of gravity and the trajectory of each point are re-planned (in step S71).

Then, this processing routine is ended with sending a target value based on the result of the re-planning to the actuator system group.

Note that although the procedure shown in FIG. 24 includes an operation for calculation of a moment developed at the series of i-th control points, operation for calculation of an external force moment applied at the series of j-th control points, and operation for calculation of a moment about a ZMP, developed due to an external force at the series of k-th control points and the operations for the i-th, j-th and k-th point series are made serially, these operations may be effected in parallel (as will be described in detail later).

Figure 25:
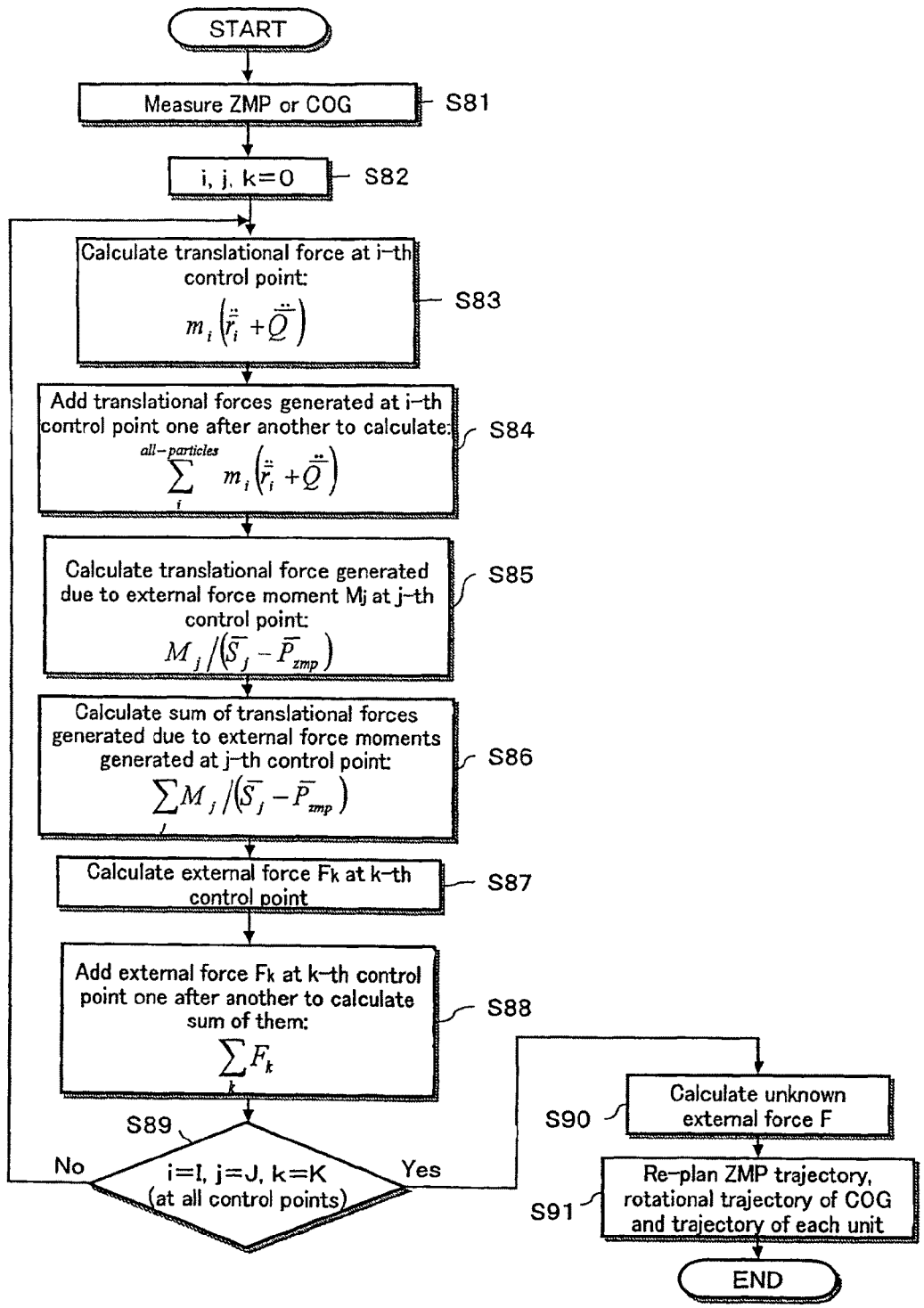
FIG. 25 shows a flow of operations made in controlling the robot to take a stable position on the basis of a solution of a dynamic equation.

FIG. 25 shows a flow of operations made in controlling the robot stability on the basis of a solution of a dynamic equation in step S53.

First, a floor reaction force $F_r$ at a ZMP is measured (in step S81).

Next, in a processing loop formed from steps S82 to S89, a translational force applied at each control point, a translational force applied due to a moment about a ZMP and an external force are calculated directly based on information from a sensor provided at each control point. The calculation is first made of moments at a point near ZMP or center of gravity. These translational force terms are added one after another to determine a sum of them.

As a result, an unknown external force F can be calculated under the d'Alembert's principle (in step S90).

Next, with the unknown external force F identified as an amount of information at each measured point being taken as an initial value, the ZMP trajectory or trajectory of the center of gravity and trajectory of each point are re-planned (in step S91).

Then, this processing routine is ended with sending a target value based on the result of the re-planning to the actuator system group.

Note that although the procedure shown in FIG. 25 includes an operation for calculation of a translational force developed at the i-th control point, operation for calculation of a translational force developed due to an external force moment at the j-th control point, and operation for calculation of an external force applied at the k-th control point and the operations for the i-th, j-th and k-th points are made serially, these operations may be effected in parallel (as will be described in detail later).

Next in a processing loop formed by steps S62 to S69 shown in FIG. 24, a moment term about a ZMP at each control point, an external force moment term applied to the control point and a moment about a ZMP, developed due to an external force applied to the control point are calculated directly based on information from a sensor provided at the control point. The calculation is first made of moments at a point near ZMP or center of gravity. These moment terms are added one after another to determine a sum of them, thereby permitting to introduce a ZMP equation.

Similarly, in a processing loop formed by steps S82 to S89 shown in FIG. 25, a translational force applied to each control point, a translational force applied due to a moment about a ZMP and an external force are calculated directly based on information from a sensor provided at each control point. The calculation is first made of moments at a point near ZMP or center of gravity. These moment terms are added one after another to determine a sum of them, thereby permitting to introduce a dynamic equation for the translation and rotation.

As having been described above with reference to FIGS. 20 to 22, the legged locomotion robot according to this embodiment includes the local coordinate used for the posture control and the acceleration sensor and angular velocity sensor disposed at each control point to directly measure the local coordinate, and the acceleration sensor and attitude sensor disposed at each vector position used in the calculation model. That is, the robot is constructed to directly measure control parameter values required to introduce a ZMP equation (or a dynamic equation).

In case the sensors distributed over the robot are connected in series to each other, a moment term and external force term calculated based on the sensor information from the sensor at each control point are added one after another for each control point along the connection route. Thus, it is possible to calculate the sum of the moment and external force efficiently.

Figure 26:
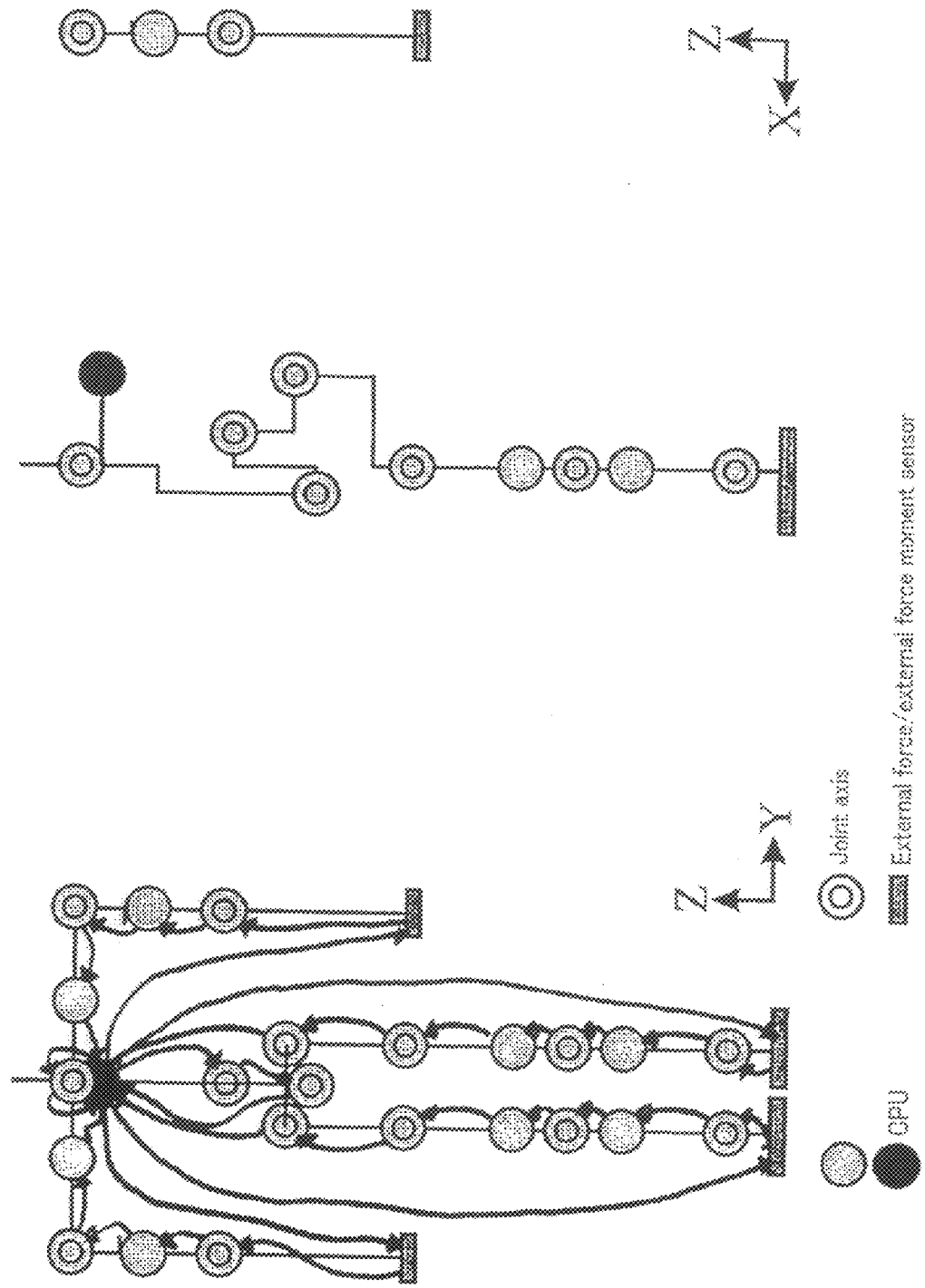
FIG. 26 shows an example in which sensors disposed near the center of gravity of each of the actuators on the legged locomotion robot are connected in series to each other.

FIG. 22 shows the acceleration sensor, angular acceleration sensor and angular velocity sensor mounted near the center of gravity of each actuator on the legged locomotion robot as having previously been described. FIG. 26 shows an example in which the sensors are connected in series to each other.

As shown in FIG. 26, the sensors provided at the right and left upper limbs and right and left lower limbs are independent of each other and connected in series to each other so that the main control unit will be both the start and end points of the sensors. In such a case, the results of calculation made based on the sensor information on the control point are added one after another, and the data is returned to the main control unit where they will be summed. In this calculation, the equation can be introduced.

Figure 27:
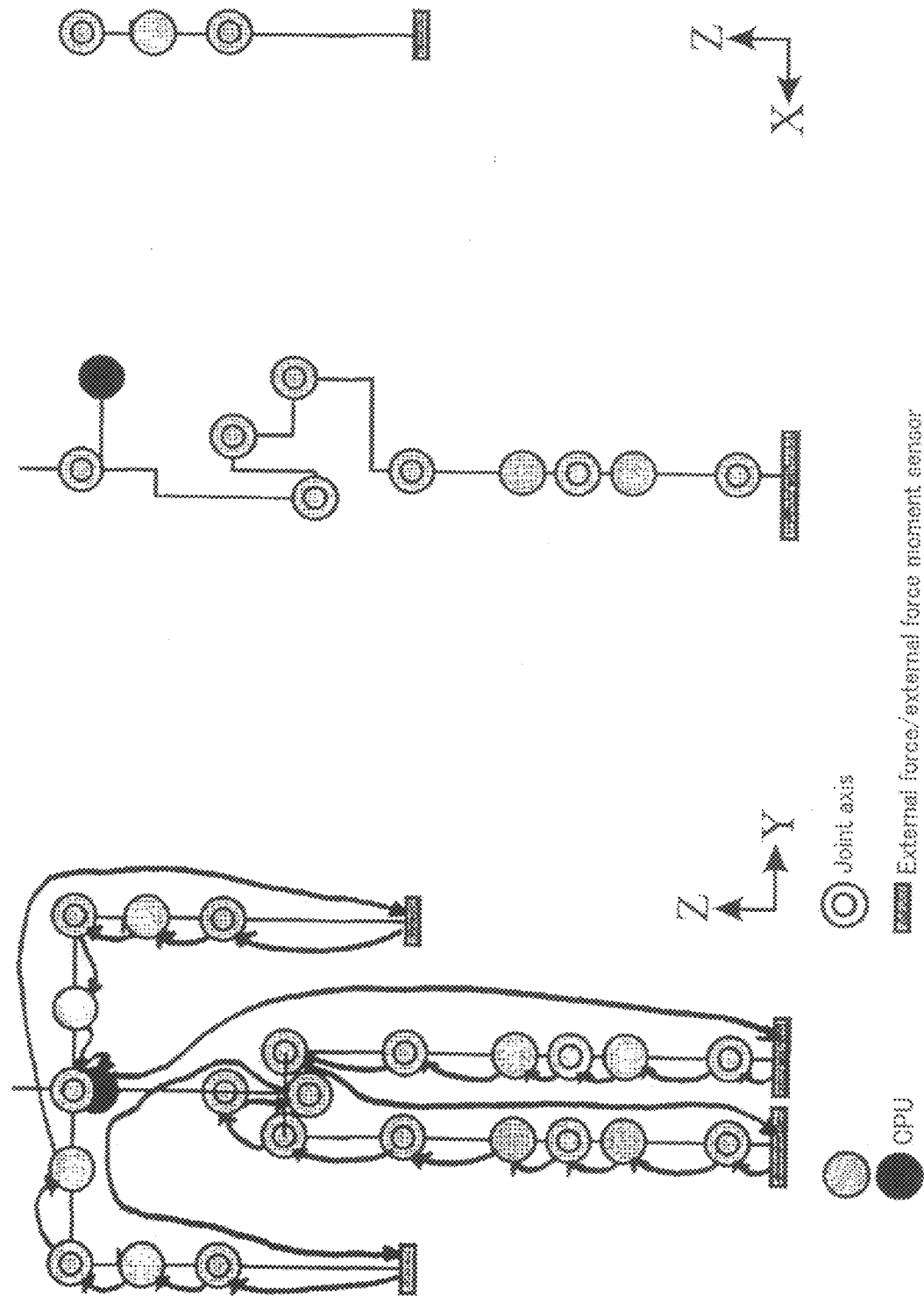
FIG. 27 also shows an example in which sensors disposed near the center of gravity of each of the actuators on the legged locomotion robot are connected in series to each other.

FIG. 27 shows another example in which the sensors are connected in series to each other. In this example shown in FIG. 27, the sensors disposed over the robot are connected in line so that the central control unit will be both the start and end points of the sensors. Because of this wiring, the results of calculation made based on the sensor information from each control point are added one after another for each control point. The sum of each term is already determined when the data is returned to the central control unit. Thus, the main control unit can easily introduce the equations.

Also, the local coordinate used for the purpose of control, and acceleration sensor and angular velocity sensor to directly measure the local coordinate are provided at each control point, and in addition, the acceleration sensor and attitude sensor are disposed in each vector position used in the calculation model. This has been already illustrated and described using an example in which an acceleration, angular acceleration and angular velocity sensors are mounted near the center of gravity of each actuator where the mass is concentrated.

Figure 28:
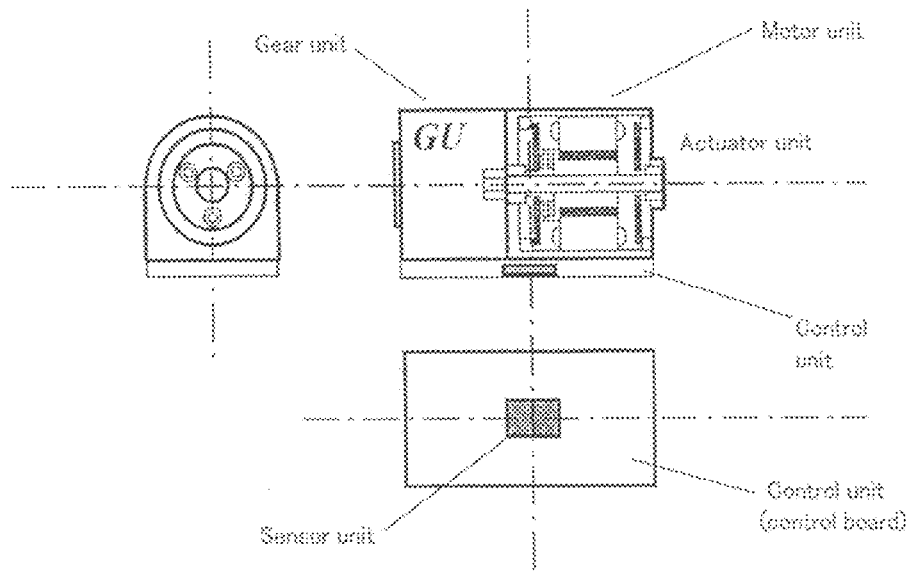
FIG. 28 shows an example construction of a joint actuator in which an acceleration sensor, angular acceleration sensor and angular velocity sensor are mounted near the center of gravity of the unit.

FIG. 28 shows an example construction of a joint actuator having acceleration, angular acceleration and angular velocity sensors mounted near the center of the actuator unit.

The joint actuator shown in FIG. 28 includes a motor formed from a rotor magnet and a stator formed from a magnetic coil having a plurality of phases, a gear unit (GU) to accelerate and decelerate the rotation output of the motor, and a control unit to control the power supply to the motor.

The control unit is formed from a printed wiring board, for example, and has a sensor unit mounted nearly in the center thereof.

The sensor unit is disposed near the two-dimensional center of gravity of the actuator unit.

The sensor unit includes a combination of one- to three-axis acceleration sensors, one- and two-axis angular velocity sensors and a three-axis angular velocity sensor.

Figure 29:
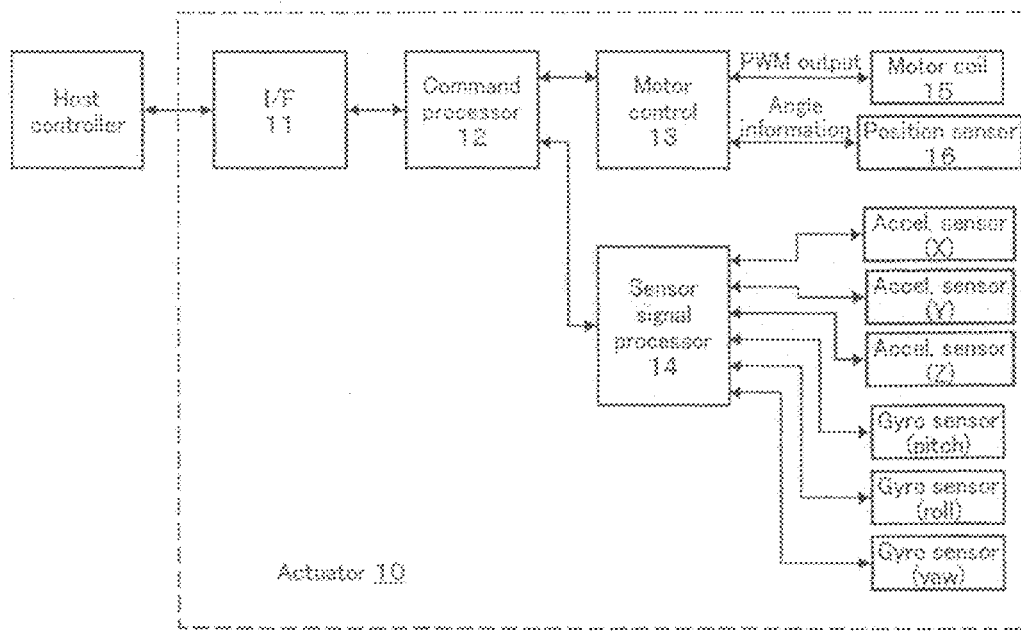
FIG. 29 schematically illustrates the functional map of the joint actuator in FIG. 28.

FIG. 29 schematically illustrates the functional construction of the joint actuator. As shown, the actuator indicated with a reference 10 includes an interface 11, command processor 12, motor controller 13 and a sensor signal processor 14.

The interface 11 implements an interface protocol in relation to a host controller.

The command processor 12 processes a host command received via the interface 11 and sends it to the motor controller 13 or calculates sensor information from the sensor information processor 14 and returns it to the host controller via the interface 11.

The motor controller 13 supplies, by PWM (pulse width modulation), the motor coil 15 with a current signal to implement a motor revolution complying with a host command, and acquires angular information from a sensor 16 which detects the rotational position of the rotor (not shown).

The sensor signal processor 14 processes sensor information from the acceleration sensors (X to Y) and gyro sensors (pitch, roll and yaw) included in the sensor unit.

According to this embodiment, a moment term about a ZMP at each control point, external force moment term applied to the control point and a moment term about a ZMP, developed to an external forced applied to the control point can be directly calculated based on sensor information for the sensors provided at each control point. This calculation is first done of such data from the sensors provided near the ZMP or center of gravity. Similarly, a translational force applied to each control point, translational force applied due to a moment about a ZMP, and an external force can be directly calculated based on information from the sensors provided at each control point. This calculation is first made of such data from the sensors provided near the ZMP or center of gravity.

Further, in case the sensors distributed over the robot are connected in series to each other, a moment term and external force term calculated based on the sensor information from the sensor at each control point are added one after another for each control point along the connection route. Thus, it is possible to calculate the sum of the moment and external force efficiently.

In the joint actuator incorporating the sensors, having been described above with reference to FIGS. 28 and 29, the command processor 12 can add the moment term and external force term one after another for each control point along the connection route with the use of the sensor information supplied from the acceleration sensors (X to Y), gyro sensors (pitch, roll and yaw) and having been processed by the sensor signal processor 14.

Figure 30:
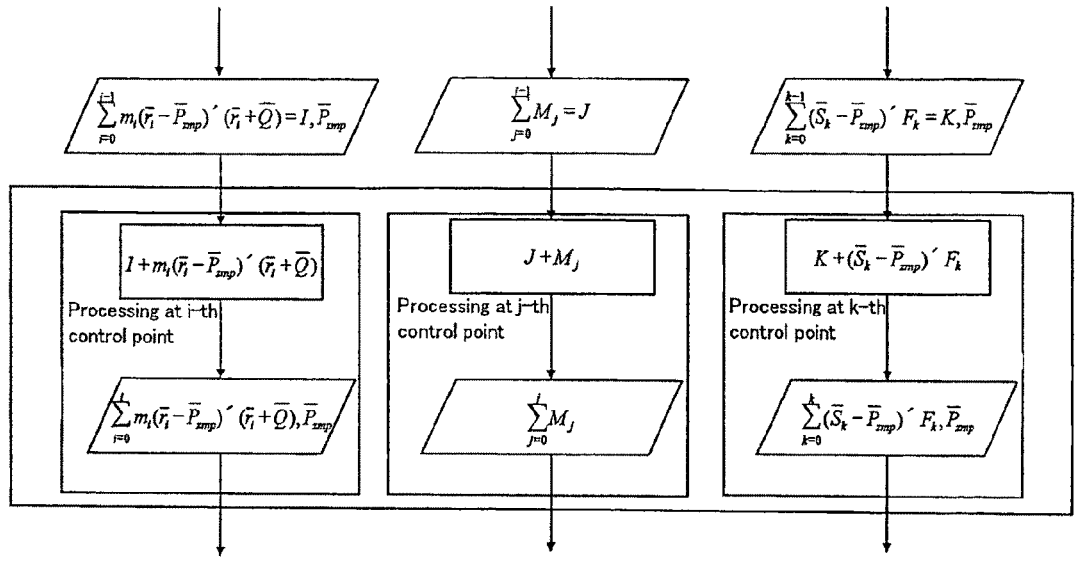
FIG. 30 shows a sequential addition, in the joint actuator at each control point, of a moment term about a ZMP, external force moment term applied to the control point, and a moment term about the ZMP, developed due to an external force applied o the control point.

FIG. 30 shows a sequential addition, done in the joint actuator at each control point, of a moment term about a ZMP, external force moment term applied to the control point, and a moment term about the ZMP, developed due to an external force applied to the control point.

As shown in FIG. 30, the joint actuator is supplied, from a higher-order joint actuator in the connection route, with a sum of moment terms about a ZMP at the control points down to the (i−1)th control point, a sum of external force moment terms at the control points down to the (j−1)th control point, and a sum of moment terms about a ZMP, developed due to an external force, at the control points down to the (k−1)th control point. The moment term about ZMP at the control point, external force moment applied to the control point and moment term about a ZMP, developed due to an external force applied to the control point are calculated based on sensor information detected in the joint actuator, and they are added to the sum of each of such terms. Then, the results are supplied to a lower-order joint actuator in the connection route as a sum of the moment terms about a ZMP at the control points down to the i-th control point, sum of the external force moments at the control points down to the j-th control point and sum of the moments about a ZMP, developed due to external forces applied to the control points down to the k-th control point. Therefore, by adding the data repeatedly along the connection route, moment terms forming a ZMP equation have already been determined when the result of calculation arrives at the main control unit. So, it is possible to implement the robot posture control using the ZMP-based stability criterion.

The introduction of an equation of ZMP equilibrium involves a calculation of a moment developed at the series of i-th control points, calculation of an external force moment applied to the series of j-th control points and a calculation of a moment about a ZMP, developed due to an external force, at the series of k-th control points. In the illustrated example, the calculations of the data from the i-th, j-th and k-th control point series are done in parallel. A system in which data from the i-th, j-th and k-th control point series are calculated in parallel is advantageous in a reduced wiring. It should be noted that all the i-th, j-th and k-th control point series are not necessary but a system in which the calculation may be limited to that of data from the i-th control point series or may be skipped over that of the data from the i-th control points to the calculation of data from the (i−1)th control point series.

Figure 31:
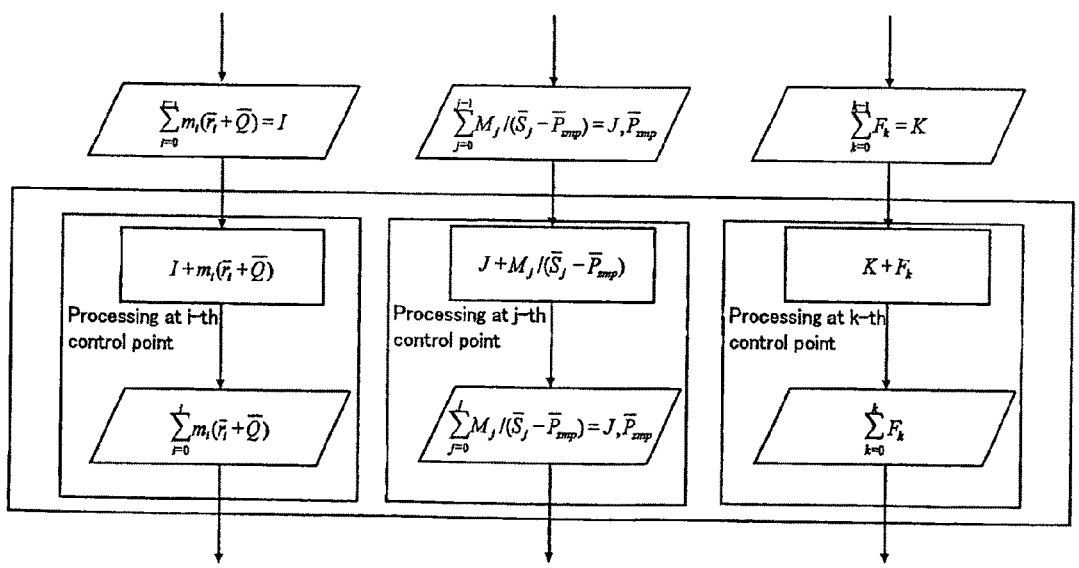
FIG. 31 shows a sequential addition, in the joint actuator at each control point, of a translation force term applied to the control point, translation force terminal applied due to a moment about a ZMP, and an external force term.

FIG. 31 shows a sequential addition, in the joint actuator at each control point, of a translation force term applied to the control point, translation force terminal applied due to a moment about a ZMP, and an external force term.

As shown in FIG. 31, the joint actuator is supplied, from a higher-order joint actuator in the connection route, with a sum of translational force terms applied to the control points down to the (i−1)th control point, a sum of translational force terms applied due to a moment about a ZMP at the control points down to the (j−1)th control point, and a sum of external force terms applied to the control points down to the (k−1)th control point. The translational force applied to the control point, translational force applied due to the moment about a ZMP and external force term are calculated based on sensor information detected in the joint actuator, and they are added to the sum of each of such terms. Then, the results are supplied to a lower-order joint actuator in the connection route as a sum of the translational force applied to the control points down to the i-th control point, sum of the translation force terms applied due the moment about a ZMP at the control points down to the j-th control point and sum of the external force terms applied to the control points down to the k-th control point. Therefore, by adding the data repeatedly along the connection route, moment terms forming a dynamic equation have already been determined when the result of calculation arrives at the main control unit. So, it is possible to implement the robot posture control using the dynamic equation.

The introduction of a dynamic equation involves a calculation of a translational force at the series of i-th control points, calculation of a translational force developed due to an external force moment at the series of j-th control points and a calculation of an external force applied to the series of k-th control points. In the illustrated example, the calculations of the data from the i-th, j-th and k-th control point series are done in parallel. A system in which data from the i-th, j-th and k-th control point series are calculated in parallel is advantageous in a reduced wiring. It should be noted that all the i-th, j-th and k-th control points are not necessary but a system in which the calculation may be limited to that of data from the i-th control point series or may be skipped over that of the data from the i-th control point series to the calculation of data from the (i−1)th control point series.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The present invention is not always limited to a product called "robot" but is applicable to a mechanical device designed to mimic the human motions with the use of the electrical or magnetic actions or any other general mobile devices such as toys belonging to other fields of industry.

In other words, the present invention has been described concerning the illustrative working examples and so the description made herein should not be limitedly interpreted but should be interpreted referring to the claims given below.

INDUSTRIAL APPLICABILITY

As having been described in the foregoing, the present invention can provide an improved and novel movement controlling device and method for a legged locomotion robot, capable of making, based on a ZMP as a posture-stability criterion, a control for stabilization of the robot posture in moving.

Also, the present invention can provide an excellent movement controlling device and method for a legged locomotion robot, capable of strictly controlling the robot to take a stable posture by deriving, a ZMP equation quickly and with a high accuracy.

Also, the present invention can provide an excellent movement controlling device and method and an improved and novel sensor system for the legged locomotion robot, capable of well controlling, based on a ZMP as a posture-stability criterion, the robot to take a stable posture.

Also, the present invention can provide an excellent movement controlling device and method, and an excellent sensor system for the legged locomotion robot, capable of well controlling the robot movement by identifying an unknown external force moment and unknown external force using a ZMP equation introduced based on measured values from sensors provided at various points on the robot.

In the legged locomotion robot according to the present invention, a reaction force sensor system to directly measure a ZMP and force is disposed at a point of direct contact with the surrounding, a local coordinate used for the movement control and an acceleration sensor and angular velocity sensor to directly measure the local coordinate are disposed, and an acceleration sensor and attitude sensor are provided at each vector position used in the calculation model, to thereby permit to directly measure control parameters required to introduce a ZMP equation (or a dynamic equation). Thus, a strict movement control can be implemented with an improved response, not on the assumption that the robot is rigid enough not to be deformable with any external force applied.

The invention claimed is:

1. A robot device including a basic unit and a plurality of moving units connected to the basic unit, the device comprising:
controlled-object points provided on the basic unit and at least one of the moving units, respectively;
a plurality of acceleration sensors disposed at the controlled-object points, respectively;
a plurality of pressure sensors and reaction force sensors disposed at contact parts of the robot device for measuring a reaction force between the robot device and an external object;
a plurality of accelerometers each associated with each of the plurality of pressure sensors disposed at the contact parts of the robot device, each of the plurality of accelerometers in proximity to a respective one of the plurality of pressure sensors, wherein each of the plurality of accelerometers provides a local coordinate for use in relation to the measured reaction force such that the local coordinate and the measured reaction force facilitate posture control for the robot device that is independent of both movement of the external object and friction coefficient of the external object:
a means for controlling the moving units; and
a means for calculating an unknown moment and unknown external force applied to the robot device with the use of a predetermined equation introduced based on acceleration information from each of the acceleration sensors, the controlling means controlling the moving units on the basis of the calculated unknown moment and unknown external force from the calculating means.

2. The robot device according to claim 1, wherein the predetermined equation is a ZMP equation or dynamic equation.

3. The robot device according to claim 1, wherein:
the plurality of moving units include at least upper and lower limbs and trunk; and
the controlled-object point is provided at each of at least the upper and lower limbs and trunk.

4. A robot device including a basic unit and moving units connected to the basic unit, the device comprising:
a plurality of controlled-object points provided on the basic unit and at least one of the moving units;
a target trajectory setting means for setting a target trajectory for each of the controlled-object points;
a plurality of pressure sensors and reaction force sensors disposed at contact parts of the robot device for measuring a reaction force between the robot device and an external object;
a plurality of accelerometers each associated with each of the plurality of pressure sensors disposed at the contact parts of the robot device, each of the plurality of accelerometers in proximity to a respective one of the plurality of pressure sensors, wherein each of the plurality of accelerometers provides a local coordinate for use in relation to the measured reaction force such that the local coordinate and the measured reaction force facilitate posture control for the robot device that is independent of both movement of the external object and friction coefficient of the external object;

a priority-order setting means for setting a priority order of the controlled-object points; and a whole-body movement pattern generating means for generating a desired whole-body movement pattern on the basis of the target priority of each of the controlled-object points, the whole-body movement pattern generating means generating a whole-body movement pattern by correcting all or a part of the target trajectories on the basis of the order of priority.

5. The robot device according to claim 4, wherein the priority setting means changes the priority order of the target trajectories correspondingly to a robot's posture.

6. The robot device according to claim 4, wherein:

an acceleration measuring means is provided at each of the controlled-object points:

the whole-body movement pattern generating means generates a whole-body movement pattern by generating a ZMP or dynamic equation for the robot and correcting each target trajectory on the basis of a solution of the ZMP or dynamic solution and the order of priority.

7. A mobile device including a basic unit and a plurality of moving members connected to the basic unit, the device comprising:

driving means for driving the moving members;

a plurality of pressure sensors and reaction force sensors disposed at contact parts of the mobile device for measuring a reaction force between the mobile device and an external object;

a plurality of accelerometers each associated with each of the plurality of pressure sensors disposed at the contact parts of the mobile device, each of the plurality of accelerometers in proximity to a respective one of the plurality of pressure sensors, wherein each of the plurality of accelerometers provides a local coordinate for use in relation to the measured reaction force such that the local coordinate and the measured reaction force facilitate posture control for the mobile device that is independent of both movement of the external object and friction coefficient of the external object;

acceleration detecting means provided at the basic unit and at least one of the moving members; and a controlling means for controlling the driving means on the basis of acceleration information from each of the acceleration detecting means.

* * * * *